(12) United States Patent
Han

(10) Patent No.: US 12,399,605 B2
(45) Date of Patent: *Aug. 26, 2025

(54) DISPLAY INTERACTION SYSTEM, AND DISPLAY METHOD AND DEVICE

(71) Applicant: Huawei Technologies Co., Ltd., Shenzhen (CN)

(72) Inventor: Guohui Han, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/762,195

(22) Filed: Jul. 2, 2024

(65) Prior Publication Data
US 2024/0353987 A1 Oct. 24, 2024

Related U.S. Application Data

(63) Continuation of application No. 18/006,082, filed as application No. PCT/CN2021/107410 on Jul. 20, 2021, now Pat. No. 12,045,446.

(30) Foreign Application Priority Data

Jul. 21, 2020 (CN) .......................... 202010708095.8

(51) Int. Cl.
G06F 17/00 (2019.01)
G06F 3/0481 (2022.01)
(Continued)

(52) U.S. Cl.
CPC .......... *G06F 3/0484* (2013.01); *G06F 3/0481* (2013.01); *G06F 3/04886* (2013.01); *G06F 3/1454* (2013.01); *G06F 2203/04803* (2013.01)

(58) Field of Classification Search
CPC .. G06F 3/0484; G06F 3/0481; G06F 3/04886; G06F 3/1454; G06F 2203/04803;
(Continued)

(56) References Cited

U.S. PATENT DOCUMENTS 9,311,965 B2 * 4/2016 Hwang ................. G06F 3/0488
9,880,716 B2 * 1/2018 Chandrasekaran ... G06F 3/0488
(Continued)

FOREIGN PATENT DOCUMENTS

CN 100403244 C * 7/2008 .......... G06F 3/0481
CN 103559033 A 2/2014
(Continued)

Primary Examiner — Laurie A Ries
(74) Attorney, Agent, or Firm — Conley Rose, P.C.

(57) ABSTRACT

The display interaction system includes a first device and a second device. The first device is configured to send interface display information of a first application to the second device. A first user interface of the first application is displayed on a display of the first device. The interface display information includes data used by the first device to display the first user interface. The second device is configured to display a second user interface of the first application based on the interface display information. Content displayed in the second user interface includes content displayed in the first user interface, a layout of the second user interface is different from a layout of the first user interface, and a display area of the second user interface is larger than a display area of the first user interface.

20 Claims, 19 Drawing Sheets

(51) Int. Cl.
  *G06F 3/0484* (2022.01)
  *G06F 3/04886* (2022.01)
  *G06F 3/14* (2006.01)
(58) Field of Classification Search
  CPC .......... G06F 3/1423; G06F 3/14; G06F 3/147; G09G 5/14; G09G 2354/00; H04M 1/72412
  See application file for complete search history.

(56) References Cited

U.S. PATENT DOCUMENTS

| | | | |
|---|---|---|---|
| 10,156,969 B2 | 12/2018 | Sirpal et al. | |
| 10,687,018 B1 | 6/2020 | Jeong et al. | |
| 10,776,103 B2 | 9/2020 | Gordon et al. | |
| 11,372,528 B2* | 6/2022 | Yang | G06F 3/04883 |
| 11,467,715 B2 | 10/2022 | Wang | |
| 11,474,666 B2 | 10/2022 | Missig et al. | |
| 11,989,482 B2 | 5/2024 | Xiong et al. | |
| 2010/0162128 A1 | 6/2010 | Richardson et al. | |
| 2012/0050183 A1 | 3/2012 | Lee | |
| 2012/0242702 A1* | 9/2012 | Sirpal | H04M 1/724 345/649 |
| 2013/0227469 A1 | 8/2013 | Park | |
| 2014/0068520 A1 | 3/2014 | Missig et al. | |
| 2015/0074589 A1 | 3/2015 | Pan et al. | |
| 2016/0132195 A1 | 5/2016 | Seto et al. | |
| 2016/0196806 A1 | 7/2016 | Lee et al. | |
| 2016/0209994 A1* | 7/2016 | Kaufthal | G06F 9/45512 |
| 2017/0255340 A1 | 9/2017 | Ishii | |
| 2017/0329499 A1 | 11/2017 | Rauschenbach et al. | |
| 2018/0150212 A1 | 5/2018 | Chen et al. | |
| 2019/0361694 A1* | 11/2019 | Gordon | G06F 9/452 |
| 2020/0042171 A1 | 2/2020 | Tao | |
| 2020/0309944 A1 | 10/2020 | Thoresen et al. | |
| 2020/0310627 A1 | 10/2020 | Ning et al. | |
| 2020/0379706 A1 | 12/2020 | Adachi | |
| 2021/0004220 A1 | 1/2021 | Hao et al. | |
| 2021/0141527 A1 | 5/2021 | Jiang | |
| 2021/0319765 A1 | 10/2021 | Chee et al. | |
| 2021/0342045 A1* | 11/2021 | Wang | G06F 1/1641 |
| 2021/0405952 A1 | 12/2021 | Wang et al. | |
| 2022/0066725 A1 | 3/2022 | Xia | |
| 2022/0147228 A1 | 5/2022 | Yi et al. | |
| 2022/0164091 A1 | 5/2022 | Kang et al. | |
| 2022/0236790 A1 | 7/2022 | Sun et al. | |
| 2022/0295027 A1 | 9/2022 | Wang et al. | |
| 2022/0391161 A1 | 12/2022 | Fan et al. | |
| 2023/0324196 A1 | 10/2023 | Santamaria et al. | |

FOREIGN PATENT DOCUMENTS

| | | | |
|---|---|---|---|
| CN | 103607510 A | 2/2014 | |
| CN | 103677711 A | 3/2014 | |
| CN | 103902161 A | 7/2014 | |
| CN | 105549843 A | 5/2016 | |
| CN | 106055327 A | 10/2016 | |
| CN | 106897038 A | 6/2017 | |
| CN | 107092456 A | 8/2017 | |
| CN | 108073341 A | 5/2018 | |
| CN | 108415645 A | 8/2018 | |
| CN | 208255756 U | 12/2018 | |
| CN | 109445572 A | 3/2019 | |
| CN | 109445733 A | 3/2019 | |
| CN | 109569214 A | 4/2019 | |
| CN | 109766066 A | 5/2019 | |
| CN | 110381195 A | 10/2019 | |
| CN | 110381345 A | 10/2019 | |
| CN | 110471639 A | 11/2019 | |
| CN | 110708086 A | 1/2020 | |
| CN | 106055327 B | 2/2020 | |
| CN | 111107518 A | 5/2020 | |
| CN | 111190558 A | 5/2020 | |
| CN | 111343698 A | 6/2020 | |
| CN | 111367456 A | 7/2020 | |
| CN | 111625163 A | 9/2020 | |
| CN | 108700999 B | 10/2020 | |
| EP | 3211911 A1 | 8/2017 | |
| WO | 2014019532 A1 | 2/2014 | |
| WO | WO-2014032564 A1 * | 3/2014 | .......... G06F 3/0481 |
| WO | 2019196744 A1 | 10/2019 | |
| WO | 2020029306 A1 | 2/2020 | |
| WO | 2020037469 A1 | 2/2020 | |
| WO | 2020119492 A1 | 6/2020 | |

* cited by examiner

DISPLAY INTERACTION SYSTEM, AND DISPLAY METHOD AND DEVICE

CROSS-REFERENCE TO RELATED APPLICATIONS

This is a continuation of U.S. patent application Ser. No. 18/006,082 filed on Jan. 19, 2023, which is a National Stage of International Patent Application No. PCT/CN2021/107410 filed on Jul. 20, 2021, which claims priority to Chinese Patent Application No. 202010708095.8 filed on Jul. 21, 2020. All of the aforementioned patent applications are hereby incorporated by reference in their entireties.

TECHNICAL FIELD

This application relates to the field of terminals and communications technologies, and in particular, to a display interaction system, and a display method and device.

BACKGROUND

Screen projection is to share content displayed on an electronic device for which screen projection is to be performed (usually a mobile terminal like a mobile phone or a tablet computer) with another second device (usually a device like a television or an intelligent interaction tablet computer, or a projector) having a display. Currently, in the screen projection field, for example, when screen projection is performed onto an intelligent interaction tablet computer, content can be projected onto the intelligent interaction tablet computer via a specific wireless hotspot, as long as an electronic device for which screen projection is to be performed can communicate with the intelligent interaction tablet computer and a corresponding screen projection application is installed on the electronic device for which screen projection is to be performed.

However, in an existing technical solution, there is no change to a size of a window that is on a desktop of the electronic device and that is displayed on the second device after projection, and consequently, a display area of the second device fails to be fully used.

SUMMARY

Embodiments of this application disclose a display method and a related apparatus, so that a display area of a second device can be fully used, to facilitate a user operation and improve user experience.

According to a first aspect, this application provides a display interaction system. The system includes a first device and a second device.

The first device is configured to send interface display information of a first application to the second device, where a first user interface of the first application is displayed on a display of the first device, and the interface display information includes data used by the first device to display the first user interface.

The second device is configured to display a second user interface of the first application based on the interface display information, where content displayed in the second user interface includes content displayed in the first user interface, a layout of the second user interface is different from a layout of the first user interface, and a display area of the second user interface is larger than a display area of the first user interface.

In this application, application content displayed by the first device (for example, a mobile phone) can be mapped to a display of the second device (for example, a tablet computer) for large-screen display, so that a screen area of the second device is fully utilized, a user is provided with an option of performing a large-screen operation, and user experience is improved.

In a possible implementation, after the first device is configured to send the interface display information of the first application to the second device, and before the second device is configured to display the second user interface based on the interface display information, the system further includes: The second device is configured to display a third user interface based on the interface display information, where a size of the third user interface does not match a size of the display of the second device, and content displayed in the third user interface is consistent with the content displayed in the first user interface; and the second device is configured to receive a first operation entered on a first control in the third user interface, where the first operation is used to trigger the second device to display the second user interface based on the interface display information.

In this embodiment of this application, the user interface mapped from the first device is first displayed based on a size of the display of the first device, so that a user can choose whether to display the user interface in full screen. This provides more options for the user.

In a possible implementation, that the second device is configured to display the second user interface based on the interface display information includes: The second device is configured to determine, based on the interface display information, that the first user interface has an attribute of landscape display; and the second device is configured to display the second user interface based on the attribute of landscape display.

In a possible implementation, that the second device is configured to display the second user interface based on the interface display information includes: The second device is configured to determine, based on the interface display information, that the first user interface has an attribute of no landscape display; and the second device is configured to display the second user interface based on the attribute of no landscape display, where the second user interface includes a plurality of small windows, the plurality of small windows include a window of a home page of the first application and a window that includes content that is consistent with the content displayed in the first user interface, and all of the plurality of small windows are windows belonging to the first application.

In the foregoing two possible implementations, regardless of whether the first user interface has the attribute of landscape display, the first user interface can be displayed in full screen on the display of the second device. This provides a feasible solution for a user in multiple aspects, and improves user experience.

In a possible implementation, the plurality of small windows include the window of the home page of the first application and a fill window, and the fill window is a window customized by the second device to display in a user interface of the first application.

In this embodiment of this application, the user interface of the first application displayed in full screen is presented to the user by using the fill window, to improve sensory experience of a user.

In a possible implementation, the interface display information includes information that is of the first application and that is in a task stack of the first device, and after the second device is configured to receive the first operation on the first control in the third user interface, the system further includes: The second device is configured to determine, based on the information that is of the first application and that is in the task stack of the first device, that the first application is installed on the second device; and the second device is configured to display the second user interface through the first application based on the interface display information.

In a possible implementation, that the second device is configured to display the second user interface through the first application based on the interface display information includes: The second device is configured to display, in response to a second operation, the second user interface through the first application based on the interface display information, where the second operation is a touch control operation on a selection button of the first application.

In this embodiment of this application, full-screen display is entered through a corresponding application, so that an effect of a displayed user interface can be better, a display delay can be reduced, and user experience can be improved.

According to a second aspect, this application provides a display method. The method includes: A second device receives interface display information of a first application from a first device, where a first user interface of the first application is displayed on a display of the first device, and the interface display information includes data used by the first device to display the first user interface; and the second device displays a second user interface based on the interface display information, where content displayed in the second user interface includes content displayed in the first user interface, a layout of the second user interface is different from a layout of the first user interface, and a display area of the second user interface is larger than a display area of the first user interface.

In a possible implementation, after the second device receives the interface display information of the first application from the first device, and before the second device displays the second user interface based on the interface display information, the method further includes: The second device displays a third user interface based on the interface display information, where a size of the third user interface does not match a size of the display of the second device, and content displayed in the third user interface is consistent with the content displayed in the first user interface; and the second device receives a first operation entered on a first control in the third user interface, where the first operation is used to trigger the second device to display the second user interface based on the interface display information.

In a possible implementation, that the second device displays the second user interface based on the interface display information includes: The second device determines, based on the interface display information, that the first user interface has an attribute of landscape display; and the second device displays the second user interface based on the attribute of landscape display.

In a possible implementation, that the second device displays the second user interface based on the interface display information includes: The second device determines, based on the interface display information, that the first user interface has an attribute of no landscape display; and the second device displays the second user interface based on the attribute of no landscape display, where the second user interface includes a plurality of small windows, the plurality of small windows include a window of a home page of the first application and a window that includes content that is consistent with the content displayed in the first user interface, and all of the plurality of small windows are windows belonging to the first application.

In a possible implementation, the plurality of small windows include the window of the home page of the first application and a fill window, and the fill window is a window customized by the second device to display in a user interface of the first application.

In a possible implementation, the interface display information includes information that is of the first application and that is in a task stack of the first device, and after the second device receives the first operation on the first control in the third user interface, the method further includes: The second device determines, based on the information that is of the first application and that is in the task stack of the first device, that the first application is installed on the second device; and the second device displays the second user interface through the first application based on the interface display information.

In a possible implementation, that the second device displays the second user interface through the first application based on the interface display information includes: The second device displays, in response to a second operation, the second user interface through the first application based on the interface display information, where the second operation is a touch control operation on a selection button of the first application.

According to a third aspect, this application provides a display device. The device includes: a first receiving unit, configured to receive interface display information of a first application from a first device, where a first user interface of the first application is displayed on a display of the first device, and the interface display information includes data used by the first device to display the first user interface; and a display unit, configured to display a second user interface based on the interface display information, where content displayed in the second user interface includes content displayed in the first user interface, a layout of the second user interface is different from a layout of the first user interface, and a display area of the second user interface is larger than a display area of the first user interface.

In a possible implementation, the display unit is further configured to: after the first receiving unit receives the interface display information of the first application from the first device, and before the display unit displays the second user interface based on the interface display information, display a third user interface based on the interface display information, where a size of the third user interface does not match a size of a display of the display device, and content displayed in the third user interface is consistent with the content displayed in the first user interface.

The display device further includes a second receiving unit, configured to receive a first operation entered on a first control in the third user interface. The first operation is used to trigger the display device to display the second user interface based on the interface display information.

In a possible implementation, the display device is specifically configured to: determine, based on the interface display information, that the first user interface has an attribute of landscape display; and display the second user interface based on the attribute of landscape display.

In a possible implementation, the display device is specifically configured to: determine, based on the interface display information, that the first user interface has an attribute of no landscape display; and display the second user interface based on the attribute of no landscape display, where the second user interface includes a plurality of small windows, the plurality of small windows include a window of a home page of the first application and a window that includes content that is consistent with the content displayed in the first user interface, and all of the plurality of small windows are windows belonging to the first application.

In a possible implementation, the plurality of small windows include the window of the home page of the first application and a fill window, and the fill window is a window customized by the display device to display in a user interface of the first application.

In a possible implementation, the interface display information includes information that is of the first application and that is in a task stack of the first device, and the display device further includes a determining unit, configured to: after the second receiving unit receives the first operation on the first control in the third user interface, determine, based on the information that is of the first application and that is in the task stack of the first device, that the first application is installed on the display device.

The display unit is further configured to display the second user interface through the first application based on the interface display information.

In a possible implementation, the display device is specifically configured to: display, in response to a second operation, the second user interface through the first application based on the interface display information, where the second operation is a touch control operation on a selection button of the first application.

According to a fourth aspect, this application provides a display device. The device includes a processor, a receiving interface, a sending interface, and a memory. The memory is configured to store a computer program and/or data, and the processor is configured to execute the computer program stored in the memory, so that the device performs the method according to any one of the second aspect or the implementations of the second aspect.

According to a fifth aspect, this application provides a computer-readable storage medium. The computer-readable storage medium stores a computer program, and when the computer program is executed by a processor, the method according to any one of the second aspect or the implementations of the second aspect is implemented.

According to a sixth aspect, this application provides a computer program product. When the computer program product is read and executed by a computer, the method according to any one of the second aspect or the implementations of the second aspect is performed.

According to a seventh aspect, this application provides a computer program. When the computer program is executed on a computer, the computer is enabled to implement the method according to any one of the second aspect or the implementations of the second aspect.

In conclusion, in this application, application content displayed by the first device (for example, a mobile phone) can be mapped to the display of the second device (for example, a tablet computer) for large-screen display, so that a screen area of the second device is fully used, a user is provided with an option of performing a large-screen operation, and user experience is improved.

DESCRIPTION OF EMBODIMENTS

The following clearly and completely describes the technical solutions in embodiments of this application with reference to the accompanying drawings in embodiments of this application.

Figure 1:
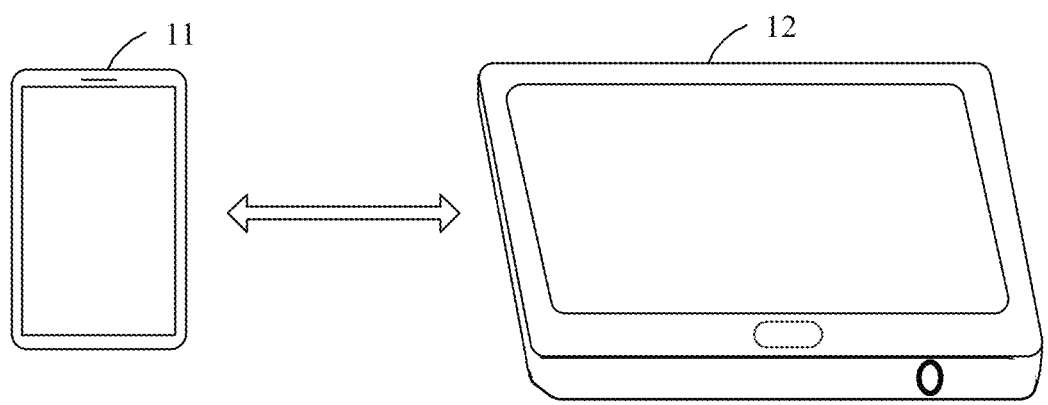
FIG. 1 is a schematic diagram of an architecture of a display interaction system according to an embodiment of this application.

To better understand a display interaction system, and a display method and device provided in embodiments of this application, the following first describes an architecture of a display interaction system to which a display method provided in embodiments of this application is applicable. FIG. 1 is a schematic diagram of a display interaction system according to an embodiment of this application. As shown in FIG. 1, the system may include one or more first devices 11 (one first device is merely shown as an example in FIG. 1) and one or more second devices 12 (one second device is merely shown as an example in FIG. 1).

One or more applications (application, APP) may be installed and ran on the first device 11. The one or more applications may be, for example, WeChat, Meituan, and Mail, or may be an application (the application is referred to as "Collaboration assistant" in subsequent embodiments of this application) used to project content displayed on the first device 11 onto the second device. The application program can also be briefly referred to as an application.

The first device 11 may include but is not limited to any hand-held electronic product based on an intelligent operating system, for example, a smartphone, a tablet computer, a hand-held computer, or a wearable electronic device, and may perform human-machine interaction with a user by using input devices such as a keyboard, a virtual keyboard, a touchpad, a touchscreen, or a voice-controlled device. The intelligent operating system includes but is not limited to any operating system that enriches functions of a device by providing various applications for the device, for example, a system such as Android (Android), IOS, Windows, and MAC.

The second device 12 may include but is not limited to a tablet computer, a personal computer, a desktop computer, a television, an in-vehicle display, a projector display, and the like. In this embodiment, the second device 12 may provide a display service for the first device 11. Corresponding programs need to run on the second device 12 to provide the display service, for example, an application (which may be referred to as "Collaboration assistant" below) for receiving and storing information sent by the first device 11, and an application (which may be referred to as "Window manager" below) displayed on a display of the second device 12 based on the information sent by the first device 11.

The second device 12 may establish a connection to the first device 11 through a data cable, Bluetooth, a Wireless Fidelity (Wireless Fidelity, Wi-Fi) network, or the like, to exchange data. For example, the first device 11 and the second device 12 may implement a communication connection by using a Wi-Fi p2p technology. When the two devices are connected to a same network, the first device 11 may search for and discover the second device 12, and then implement the communication connection to the second device 12 by receiving an operation instruction of a user. Alternatively, when the two devices access a same network at the same time, the first device 11 may search for and discover the second device 12 and automatically establish a communication connection to the second device 12. A process in which the two devices establish a communication connection is described below in detail. The details are not described herein.

The following first describes an example of an electronic device provided in the following embodiments of this application with reference to FIG. 2.

Figure 2:
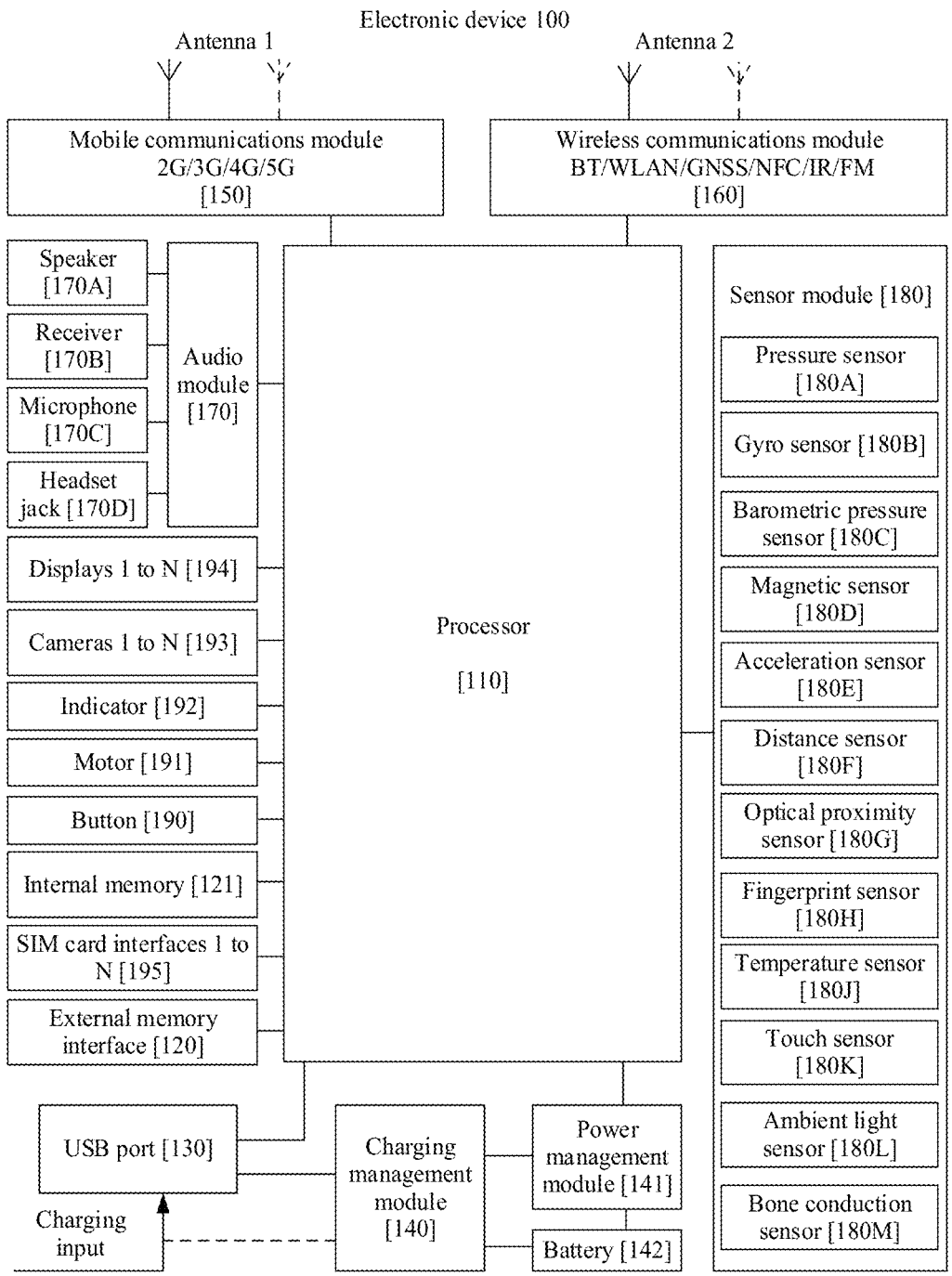
FIG. 2 is a schematic diagram of a hardware structure of an electronic device according to an embodiment of this application.

FIG. 2 is a schematic diagram of a structure of an electronic device 100. The electronic device 100 may be the second device 12 shown in FIG. 1.

The electronic device 100 may include a processor 110, an external memory interface 120, an internal memory 121, a universal serial bus (universal serial bus, USB) interface 130, a charging management module 150, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to: perform audio communication, and sample, quantize, and code an analog signal. In some embodiments, the audio module 170 may be coupled to the wireless communications module 160 through a PCM bus interface. In some embodiments, the audio module 170 may also transmit an audio signal to the wireless communications module 160 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 via the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may also be configured as the I2C interface, the I2S interface, the UART interface, the MIPI interface, or the like.

The USB port 130 is a port that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may alternatively be configured to connect to another electronic device such as an AR device.

It may be understood that an interface connection relationship between the modules illustrated in this embodiment of this application is merely an example for description, and constitutes no limitation on the structure of the electronic device 100. In some other embodiments of this application, the electronic device 100 may alternatively use an interface connection manner different from that in the foregoing embodiment, or use a combination of a plurality of interface connection manners.

The charging management module 150 is configured to receive a charging input from the charger. The charger may be a wireless charger or a wired charger. In some embodiments of wired charging, the charging management module 150 may receive a charging input from a wired charger through the USB port 130. In some embodiments of wireless charging, the charging management module 150 may receive a wireless charging input through a wireless charging coil of the electronic device 100. The charging management module 150 may further supply power to the electronic device by using the power management module 141 while charging the battery 142.

The power management module 141 is configured to connect the battery 142 and the charging management module 150 to the processor 110. The power management module 141 receives an input of the battery 142 and/or an input of the charging management module 150, and supplies power to the processor 110, the internal memory 121, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 150 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some functional modules in the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal through an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that is applied to the electronic device 100, and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processing module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-CDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite-based augmentation system (satellite-based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, quantum dot light-emitting diodes (quantum dot light-emitting diodes, QLED), or the like. In some embodiments, the electronic device 100 may include one or N displays 194, where N is a positive integer greater than 1.

The electronic device 100 may implement a photographing function through the camera 193, the ISP, the video codec, the GPU, the display 194, the application processor and the like.

The ISP is configured to process data fed back by the camera 193. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy and the like.

The video codec is configured to: compress or decompress a digital video. The electronic device 100 may support one or more video codecs. In this way, the electronic device 100 may play or record videos in a plurality of coding formats, for example, moving picture experts group (moving picture experts group, MPEG)-1, MPEG-2, MPEG-3, and MPEG-4.

The NPU is a neural network (neural network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a non-volatile memory such as at least one magnetic disk storage device, a flash memory, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some embodiments, the audio module 170 may be disposed in the processor 110, or some functional modules of the audio module 170 are disposed in the processor 110.

The speaker 170A, also referred to as a "loudspeaker", is configured to convert an audio electrical signal into a sound signal. The electronic device 100 may be used to listen to music or answer a call in a hands-free mode over the speaker 170A.

The receiver 170B, also referred to as an "earpiece", is configured to convert an electrical audio signal into a sound signal. When a call is answered or audio information is listened to by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, so as to implement a directional recording function and the like.

The headset jack 170D is configured to connect to a wired headset. The headset jack 170D may be a USB port 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages icon, an instruction for viewing an SMS message is executed. When a touch operation whose touch operation intensity is greater than or equal to the first pressure threshold is performed on a Messages icon, an instruction for creating a new SMS message is executed.

The gyro sensor 180B may be configured to determine a moving posture of the electronic device 100. In some embodiments, an angular velocity of the electronic device 100 around three axes (namely, axes x, y, and z) may be determined by using the gyro sensor 180B. The gyro sensor 180B may be configured to perform image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude by using the barometric pressure measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover based on the magnetic sensor 180D. Further, a feature such as automatic unlocking upon opening of the flip cover is set based on a detected opening or closing state of a leather case or a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure the distance in an infrared or a laser manner. In some embodiments, in a photographing scenario, the electronic device 100 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194. The touch sensor 180K and the display 194 constitute a touchscreen, and the touchscreen is also referred to as a "touch control screen". The touch sensor 180K is configured to detect a touch operation performed on or near the touch sensor. The touch sensor may transfer the detected touch operation to the application processor, to determine a type of a touch event. A visual output related to the touch operation may be provided on the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also contact a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal that is of the vibration bone of the vocal-cord part and that is obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 can support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external memory card. The electronic device 100 interacts with a network by using the SIM card, to implement functions such as conversation and data communication. In some embodiments, the electronic device 100 uses an eSIM, namely, an embedded SIM card. The eSIM card may be embedded into the electronic device 100, and cannot be separated from the electronic device 100.

Figure 3:
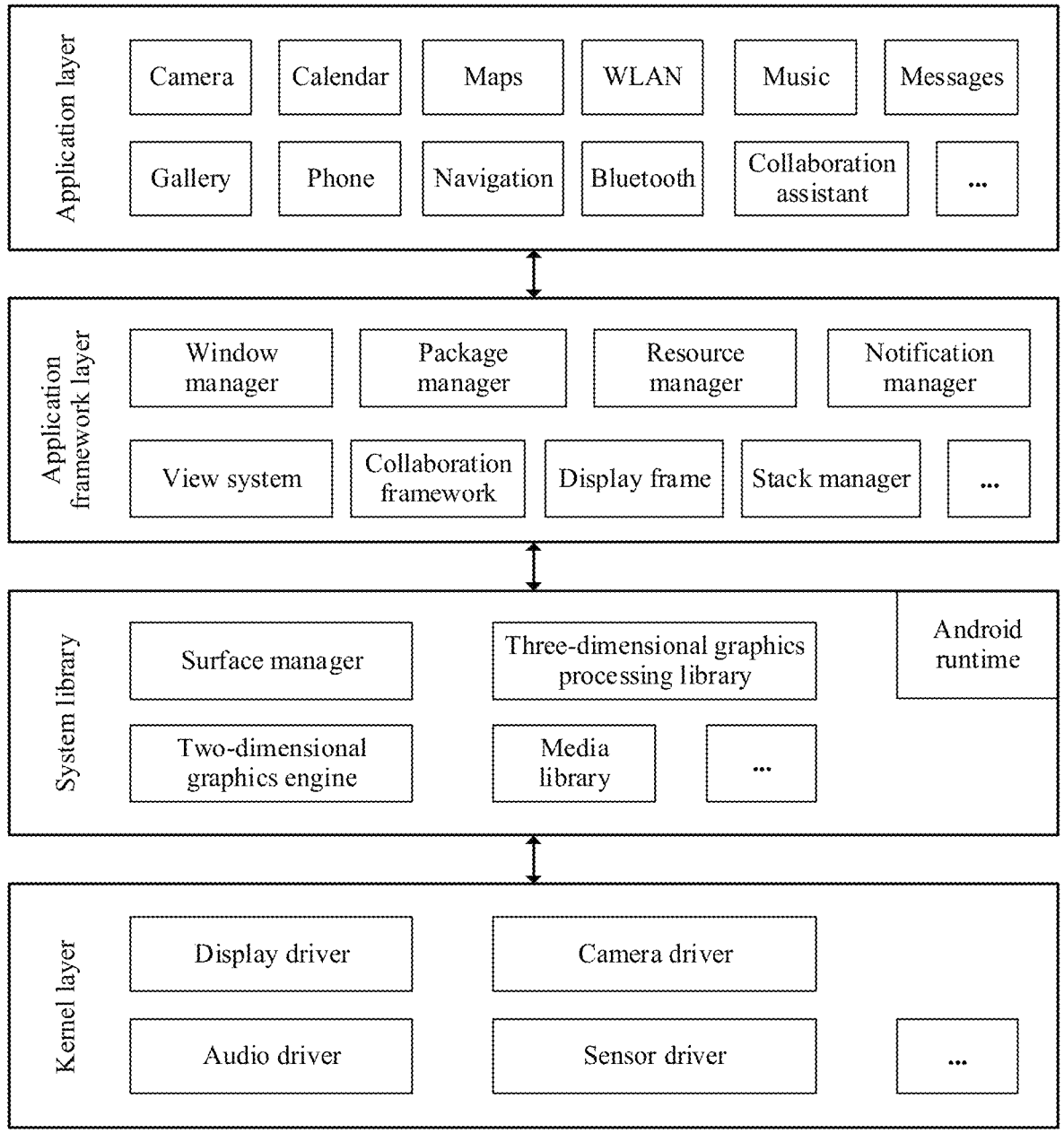
FIG. 3 is a schematic diagram of a software structure of an electronic device according to an embodiment of this application.

Based on a schematic diagram of a hardware structure of an electronic device 100 according to an embodiment of this application shown in FIG. 2, the following describes a block diagram of a software structure of an electronic device 100 according to an embodiment of this application as shown in FIG. 3.

A software system of the electronic device 100 may use a layered architecture, an event-driven architecture, a micro-kernel architecture, a micro service architecture, or a cloud architecture. In embodiments of this application, an Android system with a layered architecture is used as an example to describe a software structure of the electronic device 100.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 3, the application package may include applications such as Camera, Gallery, Calendar, Phone, Maps, Navigation, WLAN, Bluetooth, Music, Messages, and Collaboration assistant.

The application framework layer provides an application programming interface (application programming interface, API) and a programming framework for an application at the application layer. The application framework layer includes some predefined functions.

As shown in FIG. 3, the application framework layer may include a window manager, a package manager, a resource manager, a notification manager, a view system, a collaboration framework, a display framework, a stack manager, and the like.

The window manager is configured to manage a window program. The window manager may obtain a size of a display, determine whether there is a status bar, perform screen locking, take a screenshot, and the like.

The package manager may be configured to manage installation and uninstallation of an installation package of an application, parsing and querying of configuration information of the installation package, and the like.

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without requiring a user interaction. For example, the notification manager is configured to notify download completion, give a message notification, and the like. The notification manager may be a notification that appears in a top status bar of the system in a form of a graph or a scroll bar text, for example, a notification of an application running on the background, or may be a notification that appears on the screen in a form of a dialog window. For example, text information is displayed in the status bar, an alert sound is played, the electronic device vibrates, or an indicator light blinks.

The view system includes visual controls such as a control for displaying a text and a control for displaying an image. The view system may be configured to construct an application. A display interface may include one or more views. For example, a display interface including an icon of notification via short message may include a text display view and an image display view.

The collaboration framework is configured to notify, to the "Collaboration assistant" at the application layer, each event for establishing a connection between the electronic device 100 and a first device (for example, the first device 11 shown in FIG. 1), and may be further configured to assist the "Collaboration assistant" in obtaining data information in response to an instruction of "Collaboration assistant" at the application layer. For example, the collaboration framework may implement a "Onehop" (Onehop) service and a multicast source discovery protocol (multicast source discovery protocol, MSDP) service. That is, the electronic device 100 may establish a communication connection to the first device based on the Onehop service and the MSDP service.

The display framework is configured to obtain display data in an interface or a window of an application that is being displayed in the electronic device 100 and send the display data to "Collaboration assistant" by using the collaboration framework, or may be configured to obtain, by using the collaboration framework, display data that is received by "Collaboration assistant" and that is from the first device (for example, the first device 11 shown in FIG. 1).

The stack manager may be configured to store and manage process information of an application that runs in the electronic device 100. For example, in this embodiment of this application, information about an activity (activity) of an application may be stored by using the stack manager. For example, information such as a package name and a class name of each activity is stored.

The Android runtime includes a core library and a virtual machine. The Android runtime is responsible for scheduling and management of an Android system.

The core library includes two parts: a function that needs to be invoked in java language, and a core library of Android.

The application layer and the application framework layer may run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (media libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video coding formats, for example, MPEG4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working procedure of software and hardware of the electronic device 100 with reference to a scenario in which the first device (for example, the first device 11 shown in FIG. 1) transmits data to the electronic device 100. It should be noted that a desktop of the electronic device 100 may be one or more user interfaces displayed in a home screen area after the electronic device is started and a system of the electronic device is successfully logged in to. These user interfaces may include icons and names of applications installed on the electronic device.

When the touch sensor 180K receives a touch operation, a corresponding hardware interrupt is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event.

For example, the touch operation is a touch tap operation, and a control corresponding to the tap operation is a control of the "Collaboration assistant" application. The "Collaboration assistant" application invokes a collaboration framework interface at the application framework layer to start "Collaboration assistant" application.

It should be noted that, for a hardware structure and a software structure framework of the first device (for example, the first device 11 shown in FIG. 1) provided in this embodiment of this application, refer to the structures shown in FIG. 2 and FIG. 3. Certainly, the hardware structure and the software structure framework of the first device may not be the same as those of the second device (the electronic device 100). This is specifically determined based on an actual situation. Details are not described herein.

Based on the system framework in FIG. 1, the device hardware framework in FIG. 2, and the device software framework in FIG. 3, embodiments of this application provide a display method and a device. A "Collaboration assistant" application is installed on the device in embodiments of this application. In embodiments of this application, information of a first device needs to be transmitted to a second device when "Collaboration assistant" of the device is enabled.

"Collaboration assistant" may be a service or a function provided by the device, and may be configured to implement functions such as establishing a communication connection between the first device and the second device, transmitting data between the first device and the second device, and transmitting an instruction between the second device and the first device. For example, "Collaboration assistant" may be an Android package (Android Package, APK), and may be installed in the device in a form of a control or an APP.

In a specific implementation, the three functions of establishing a communication connection between the first device and the second device, transmitting data between the first device and the second device, and transmitting an instruction between the second device and the first device may not be integrated into one APK file, and these functions may be implemented by using one or more APK files.

It can be understood that "Collaboration assistant" is merely a word used in the embodiments, a meaning represented by the word has been recorded in the embodiments, and a name of the word does not constitute any limitation on the embodiments.

Examples are used below to describe some user interfaces (user interface, UI) provided by the first device and the second device in embodiments of this application. The term "user interface" in the specification, claims, and accompanying drawings of this application refers to a medium interface that is used for interaction and information exchange between an application or an operating system and a user and implements conversion between an internal form of information and a form that can be accepted by the user. The user interface is usually represented in a form of a graphical user interface (graphical user interface, GUI), and is a user interface that is related to a computer operation and that is displayed in a graphic manner. The GUI may be an interface element displayed on a display of an electronic device, for example, an icon, a window, or a control. The control may include a visual interface element, for example, an icon, a button, a menu, a tab, a text box, a dialog box, a status bar, a navigation bar, or a widget.

Figure 4A:
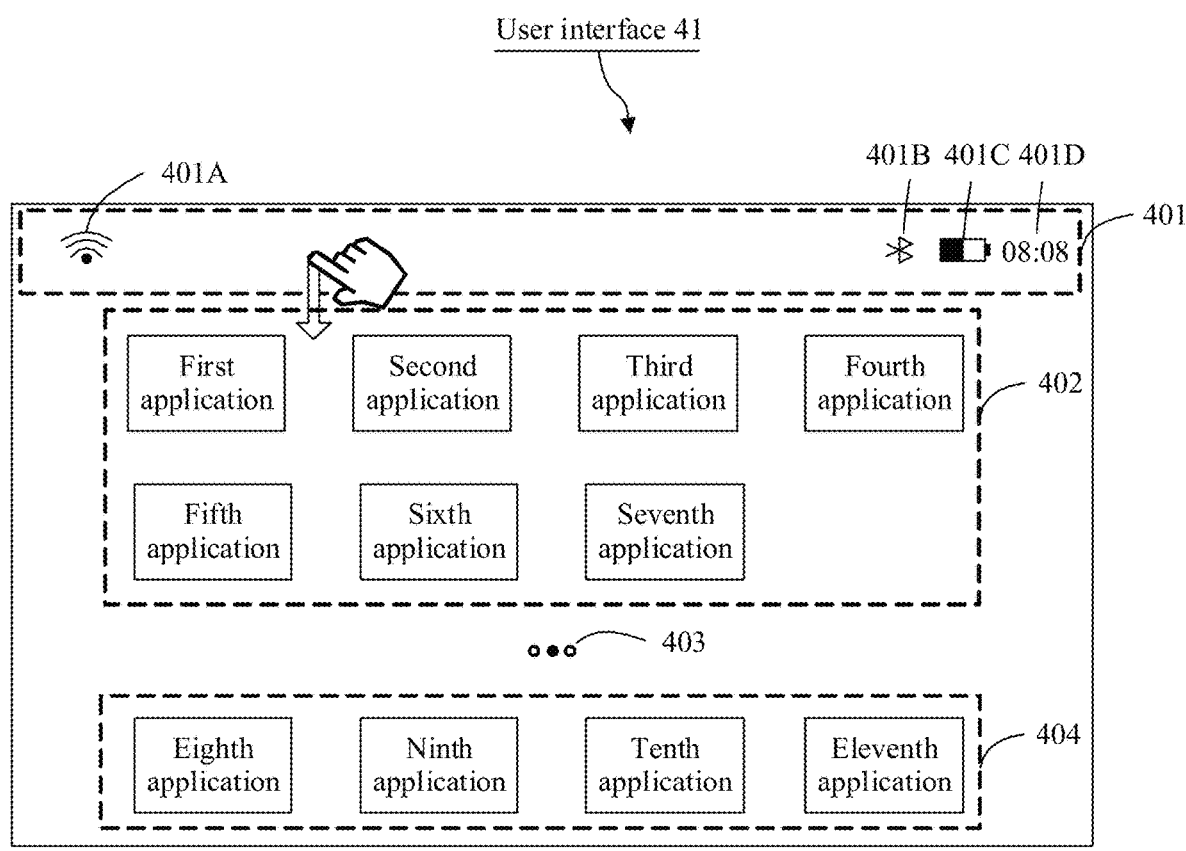
FIG. 4A is a schematic diagram of a user interface of an electronic device according to an embodiment of this application.

FIG. 4A shows an example of a user interface 41 that is on the second device and that is used to display an application installed on the second device.

The user interface 41 may include a status bar 401, an application icon 402, a page indicator 403, a tray 404 including a frequently-used application icon, and another indicator (not shown in FIG. 4A). The status bar 401 may include one or more signal strength indicators 401A of a wireless fidelity (wireless fidelity, Wi-Fi) signal, a Bluetooth indicator 401B, a battery status indicator 401C, and a time indicator 401D.

The application icon 402 includes icons of a first application, a second application, a third application, a fourth application, a fifth application, a sixth application, a seventh application, and the like. These applications may be Mailbox, Phone Manager, Gallery, VMALL, Video, Internet, Clock, QQ, WeChat, Taobao, Amap, and the like.

The page indicator 403 may be used to indicate a specific page at which a user is browsing an application icon. The user may slide leftward or rightward in an area including the application icon 402, to browse an application icon on another page. These pages may also be referred to as a desktop of the second device.

The tray 404 including a frequently-used application icon may display icons of an eighth application, a ninth application, a tenth application, an eleventh application, and the like. These applications may be relatively frequently-used applications, for example, may be Settings, Music, Reading, and Camera.

In some embodiments, the user interface 41 may further include a navigation bar. The navigation bar may include system navigation buttons such as a back button, a home button, and a multi-task button. When detecting that the user taps the back button, the second device may display a previous page of a current page. When detecting that the user taps the home button, the second device may display a home screen. When detecting that the user taps the multi-task button, the second device may display a task recently started by the user. Names of the navigation buttons may alternatively be other names. This is not limited in this application. Not limited to a virtual button, the navigation buttons in the navigation bar may alternatively be implemented as a physical button.

In some other embodiments, the second device may further include a physical home button. The home button may be configured to receive an instruction of the user, and return a currently-displayed UI to the home screen, so that the user can view the home screen at any time. The instruction may be specifically an operation instruction of pressing the home button once by the user, may be an operation instruction of consecutively pressing the home button twice within a short time period by the user, or may be an operation instruction of touching and holding the home button within a predetermined time period by the user. In some other embodiments of this application, a fingerprint sensor may be further integrated in the home button, so that a fingerprint is collected and recognized when the home button is pressed.

It may be understood that FIG. 4A merely shows an example of a user interface on the second device, and should not constitute a limitation on embodiments of this application.

An example is used below to describe a manner of enabling "Collaboration assistant" on the second device provided in this embodiment of this application.

Figure 4B:
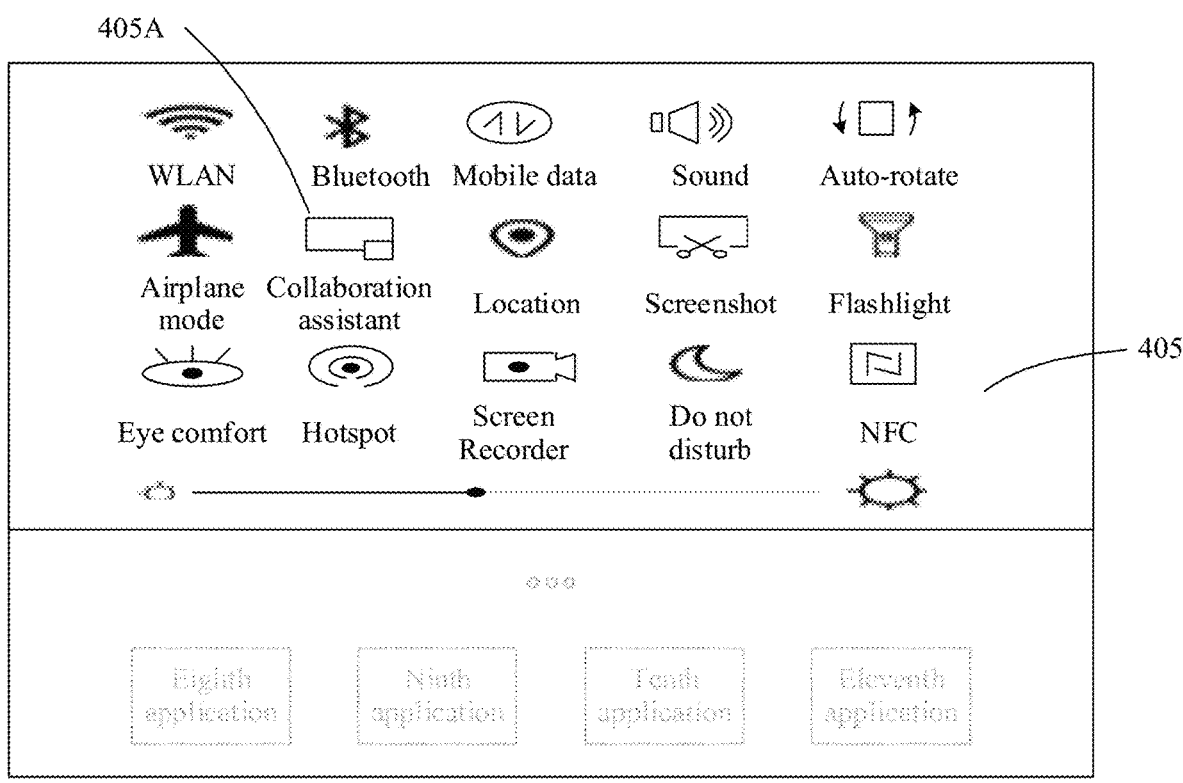
FIG. 4B is a schematic diagram of a dropdown menu of a status bar in a user interface of an electronic device according to an embodiment of this application.

FIG. 4A and FIG. 4B show an example of an operation of enabling "Collaboration assistant" on the second device.

As shown in FIG. 4A, when the second device detects a downward slide gesture on the status bar 401, the second device may display a window 405 in the user interface 41 in response to the gesture. As shown in FIG. 4B, the window 405 may display a switch control 405A of "Collaboration assistant", and may further display switch controls of other functions (for example, Wi-Fi, Bluetooth, and a flashlight). When detecting a touch operation (for example, an operation of tapping or touching the switch control 405A) on the switch control 405A in the window 405, the second device may enable "Collaboration assistant" in response to the touch operation.

In other words, the user may perform a downward slide gesture on the status bar 401 to open the window 405, and may tap the switch control 405A of "Collaboration assistant" in the window 405 to conveniently enable "Collaboration assistant". A representation form of the switch control 405A of "Collaboration assistant" may be but is not limited to text information and/or an icon.

In a possible implementation, "Collaboration assistant" may alternatively be displayed on the desktop of the second device in a form of an application icon as an application such as Mailbox or Gallery. After detecting an operation such as tapping or touching a "Collaboration assistant" icon, the second device enables "Collaboration assistant" on the second device.

Figure 4C:
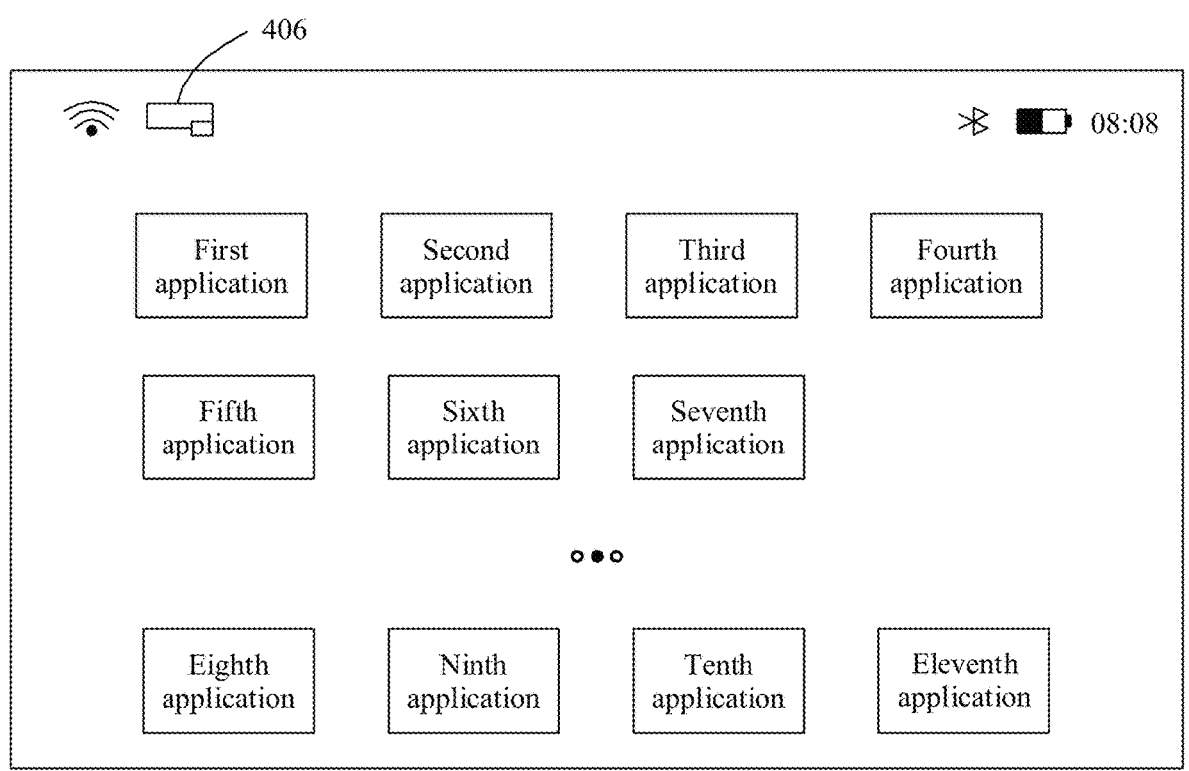
FIG. 4C is a schematic diagram of another user interface of an electronic device according to an embodiment of this application.

In some embodiments of this application, after enabling "Collaboration assistant", the second device may further display, in the status bar 401, prompt information indicating that "Collaboration assistant" has been enabled. For example, a "Collaboration assistant" icon is displayed or a "Collaboration assistant" text is directly displayed in the status bar 401. For example, refer to FIG. 4C. In FIG. 4C, an icon 406 is "Collaboration assistant" icon. It should be noted that the icon of "Collaboration assistant" is not limited to the icons shown in FIG. 4B and FIG. 4C, and this is merely an example. A specific representation form of the icon of "Collaboration assistant" is not limited in this solution.

In this embodiment of this application, enabling "Collaboration assistant" is not limited to the manner shown above. In some embodiments, "Collaboration assistant" may be enabled in another manner. In some other embodiments, the second device may alternatively enable "Collaboration assistant" by default, for example, automatically enable "Collaboration assistant" after being powered on.

For an operation of enabling "Collaboration assistant" on the first device, refer to the foregoing operation of enabling "Collaboration assistant" on the second device. Details are not described herein again. After "Collaboration assistant" is enabled on the first device and the second device, the first device may establish a communication connection to the second device, and then transmit data to the second device.

Examples are used below to describe some embodiments of graphical user interfaces implemented when the first device establishes a communication connection to the second device after the first device and the second device enable a "Collaboration assistant" function.

First, an example is used in which the first device is a mobile phone and the second device is a tablet computer or a portable computer (tablet personal computer, Tablet PC) to describe a process in which the first device and the second device discover a device and communicate to establish a connection through near field communication (Near Field Communication, NFC). The following describes a process in which two devices establish a connection in two cases.

Case 1: The first device and the second device are not logged in to a same system account.

In a specific embodiment, it is assumed that both the first device and the second device are devices of a same brand, but the two devices are not logged in to a same system account after being started; or the first device and the second device are devices of different brands. In these cases, it indicates that the first device and the second device are devices with different accounts, that is, devices that are not logged in to a same system account at the same time. In this case, the first device and the second device may be connected in the following manner.

Specifically, both the first device and the second device have an NFC function. When both the NFC functions of the first device and the second device are enabled, the first device may be placed to approach or touch the second device. For example, a preset part of the first device, for example, a back, may be placed to approach or touch a preset location on the second device, for example, a location with a sharing or connection tag. The first device and the second device may discover each other. A display of the first device may display a user interface of the discovered second device, for example, an interface shown in FIG. 5A.

Figure 5A:
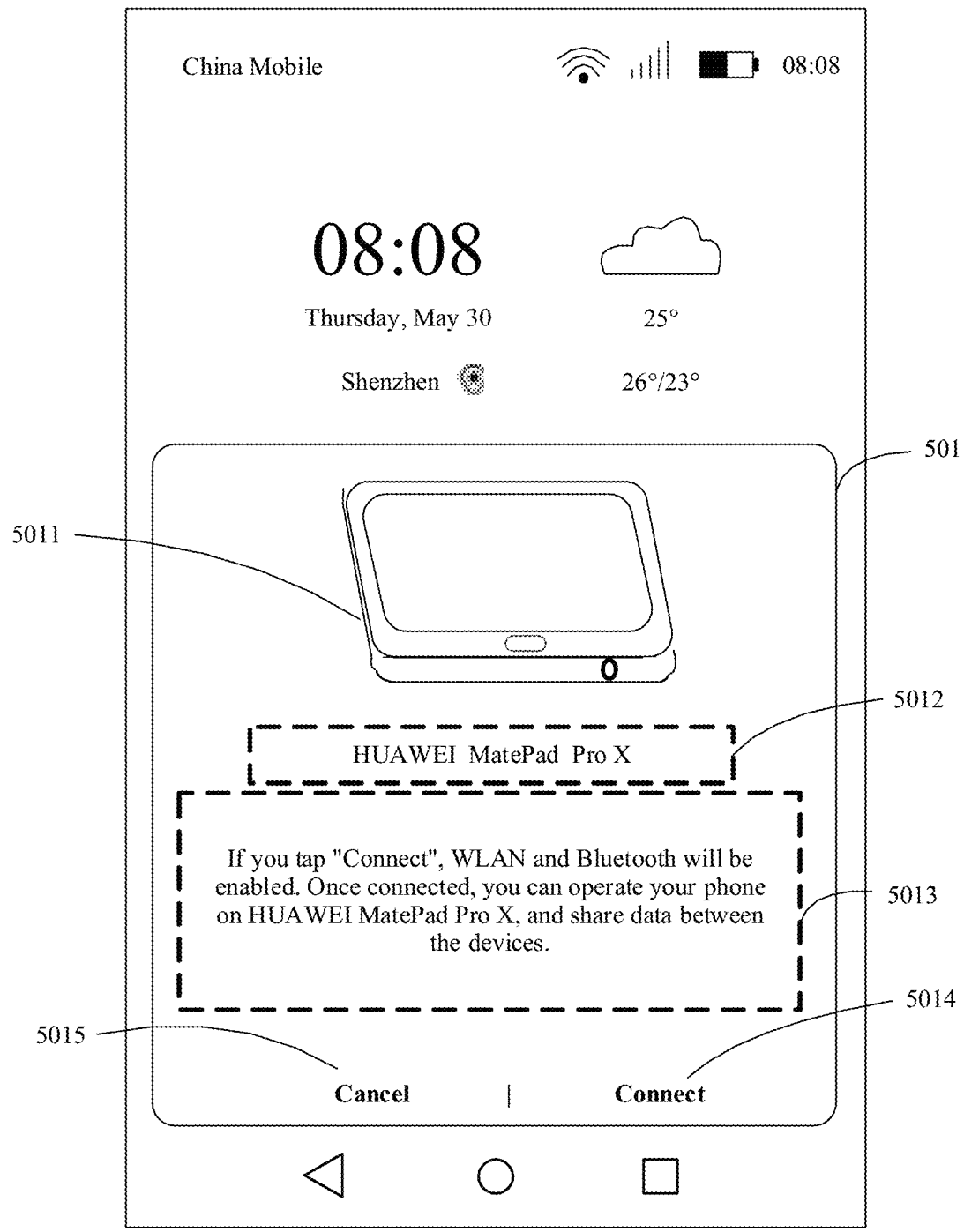
FIG. 5A to FIG. 5C are schematic diagrams of user interfaces in a process of establishing a connection between two devices according to an embodiment of this application.

The user interface shown in FIG. 5A includes a window 501. The window 501 includes an icon 5011 of the discovered second device, a name 5012 of the second device, prompt information 5013, a "Connect" control 5014, and a "Cancel" control 5015.

The icon 5011 of the second device may be, for example, an icon of a tablet computer. The name 5012 of the second device may be, for example, HUAWEI MatePad Pro X. The prompt information 5013 may be used to describe, to a user, a function of the "Connect" control 5014 and a function after the connection. For example, the prompt information 5013 may be as follows: "If you tap "Connect", WLAN and Bluetooth will be enabled. Once connected, you can operate your phone on HUAWEI MatePad Pro X, and share data between the devices." "Connect" control 5014 may be configured to send a connection confirmation request to the second device. The "Cancel" control 5015 may be used to cancel a connection operation between the second device and the second device.

Optionally, after the "Connect" control 5014 is tapped in FIG. 5A, WLAN and Bluetooth are enabled. In this case, a process of establishing a connection between the first device and the second device may be completed through Bluetooth. After the connection is successfully established, data exchange and sharing between the first device and the second device may be implemented through WLAN. After the connection is established through Bluetooth, data exchange between the first device and the second device is implemented through WLAN, so that a speed of data exchange can be increased, and efficiency of the first device and the second device in responding to each other can be improved.

Figure 5B:
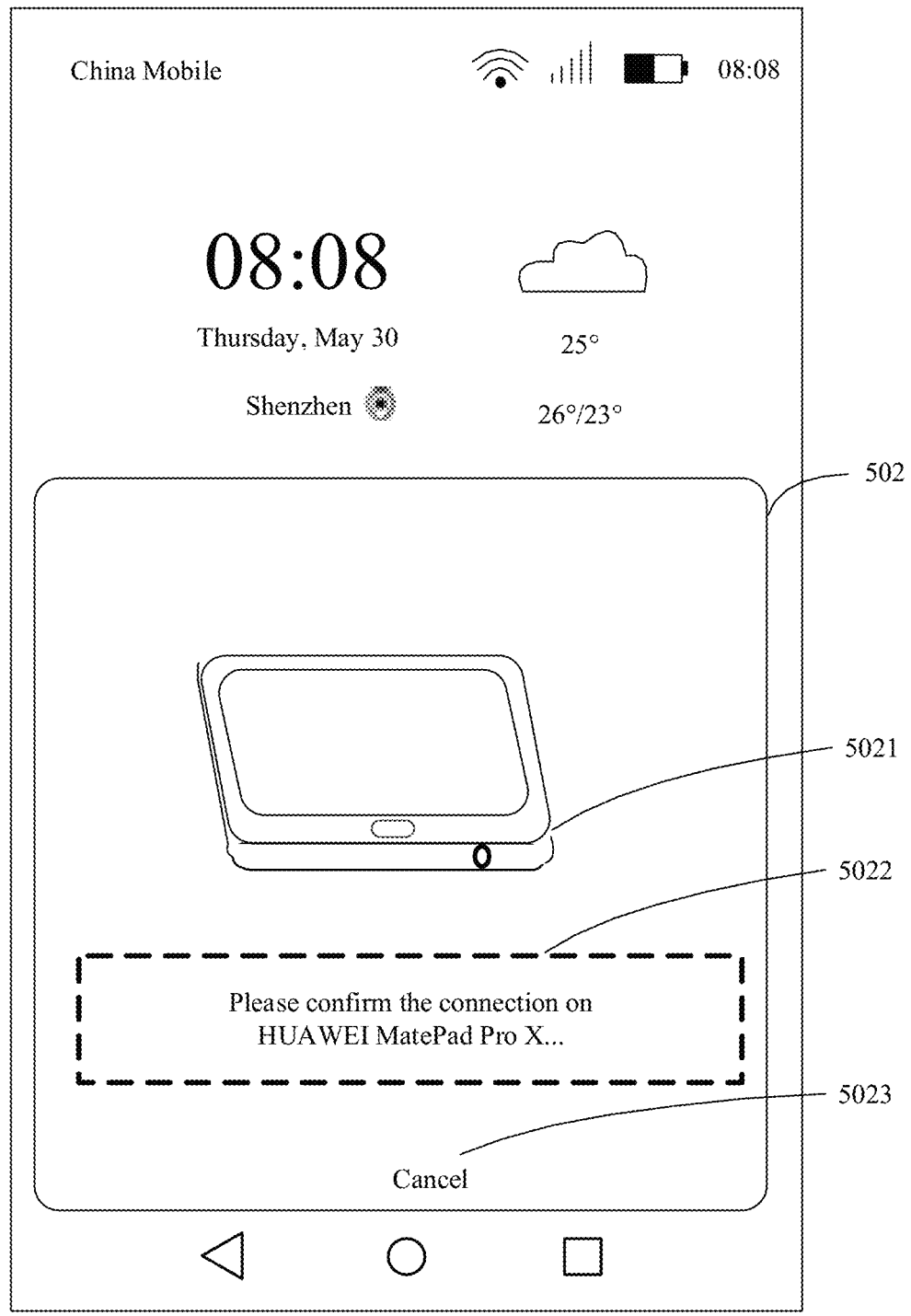

In the user interface shown in FIG. 5A, the first device displays a user interface shown in FIG. 5B in response to a touch control operation on the "Connect" control 5014. In FIG. 5B, a window 502 in which the first device waits for confirmation from the second device after sending a connection confirmation request to the second device is included. Similarly, the window 502 may include an icon 5021 of the second device, and further include prompt information 5022 and a "Cancel" control 5023.

The icon 5021 of the second device may be, for example, an icon of a tablet computer. The prompt information 5022 is used to indicate waiting for confirmation from the second device. For example, the prompt information 5022 may be as follows: "Please confirm the connection on HUAWEI MatePad Pro X." The "Cancel" control 5023 may be used to cancel a connection operation between the first device and the second device.

In the user interface shown in FIG. 5A, the first device sends a connection request to the second device in response to the touch control operation on the "Connect" control 5014. After receiving the connection request, the second device displays a user interface shown in FIG. 5C.

Figure 5C:
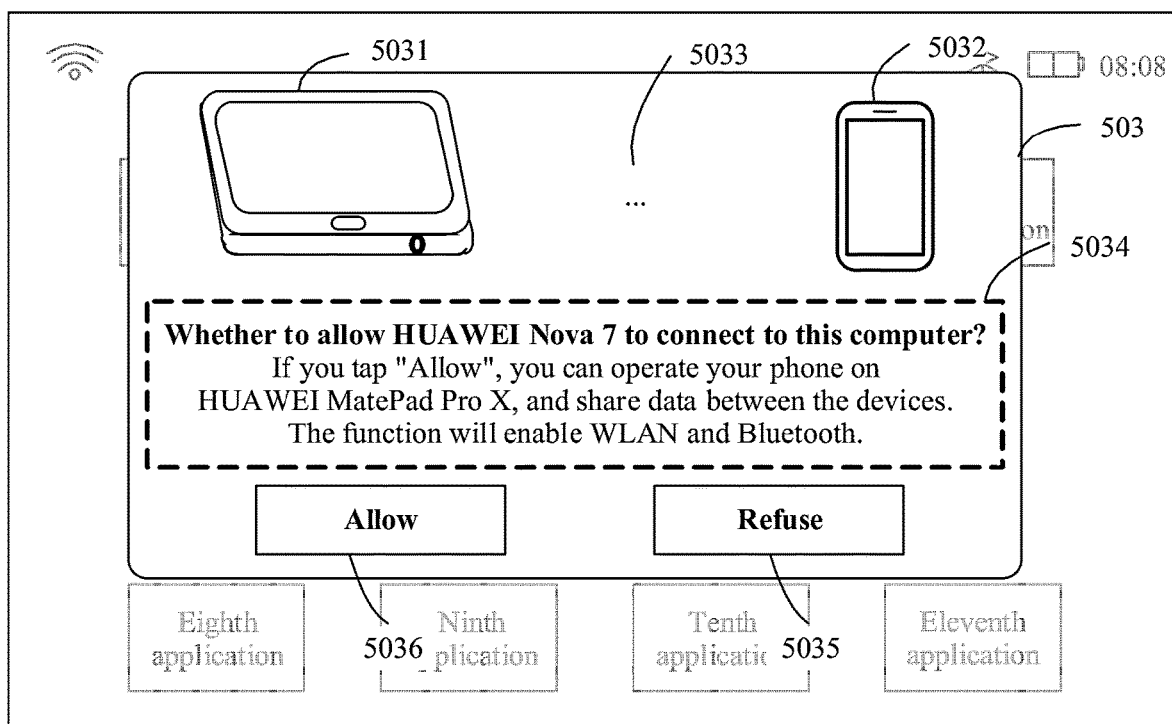

The user interface shown in FIG. 5C includes a confirmation window 503 indicating whether the second device is connected to the first device. The window 503 includes an icon 5031 of the second device, an icon 5032 of the first device, a correlation identifier 5033 of the second device and the first device, prompt information 5034, a "Refuse" control 5035, and an "Allow" control 5036.

The icon 5031 of the second device may be, for example, an icon of a computer. The icon 5032 of the second device may be, for example, an icon of a mobile phone. The prompt information 5034 may be used to prompt to determine whether to allow a connection, and describe for the user a function of the "Allow" control 5036 and a function after the connection. For example, the prompt information 5034 may be as follows: "Whether to allow HUAWEI Nova 7 to connect to the computer? If you tap "Allow", you can operate your phone on HUAWEI MatePad Pro X, and share data between the devices. The function will enable WLAN and Bluetooth." In the example, HUAWEI Nova 7 is a name of the first device. The "Refuse" control 5035 may be configured to reject a connection to the second device. The "Allow" control 5036 may be configured to establish a connection to the second device. HUAWEI Nova 7 is a name of the second device.

In the user interface shown in FIG. 5C, the second device determines to establish a connection to the first device in response to an operation of tapping or touching the "Allow" control 5036. For example, an interface diagram shown in FIG. 6A may be a user interface of the second device after the connection is established. The interface diagram shown indicates that a connection between the first device and the second device is successfully established, that is, information of the first device is transmitted to the second device and displayed on a display. An interface diagram shown in FIG. 6B is described in detail below, and the details are not described herein.

The first device and the second device may be connected to a same wireless network. If the first device and/or the second device are/is already connected to the wireless network, in the interfaces/interface shown in FIG. 5A and/or FIG. 5C, the first device and/or the second device may not need to connect to the wireless network again.

Specifically, an implementation of transmitting the information of the first device to the second device and displaying the information on the display may be as follows:

After the first device successfully establishes the connection to the second device, a "collaboration framework" of the first device (for example, the collaboration framework at the application framework layer in FIG. 3) notifies "Collaboration assistant" of the first device (for example, the collaboration assistant at the application framework layer in FIG. 3) of an event of the successful connection establishment. In response to the event notification, "Collaboration assistant" obtains first interface display information on the first device by using a resource manager (for example, the resource manager at the application framework layer in FIG. 3) of the first device or the "collaboration framework" of the first device.

The first interface display information is information of a first user interface that is of a first application and that is being displayed on the display of the first device, and the information may include data that is used by the first device to display the first user interface. Specifically, the first interface display information may include stack information of the first user interface that is being displayed on the display, data of content displayed on the interface, and the like. The stack information may include a package name, a class name, and the like of a displayed activity (Activity) service of an application. The resource manager or the "collaboration framework" of the first device may obtain, by using a "display framework" (for example, a display framework at the application program framework layer in FIG. 3), the data of content displayed on the interface.

After obtaining the first interface display information, "Collaboration assistant" of the first device may send the first interface display information to the second device by using a WLAN, that is, the connected wireless network. The second device receives the first interface display information by using "Collaboration assistant" of the second device, and sends the first interface display information to a "display framework" of the second device by using a "collaboration framework" of the second device, the "display framework" invokes a window manager (for example, the window manager at the application framework layer in FIG. 3) to display a window on the display based on the information, and content displayed in the window includes the content displayed in the first user interface.

Figure 6A:
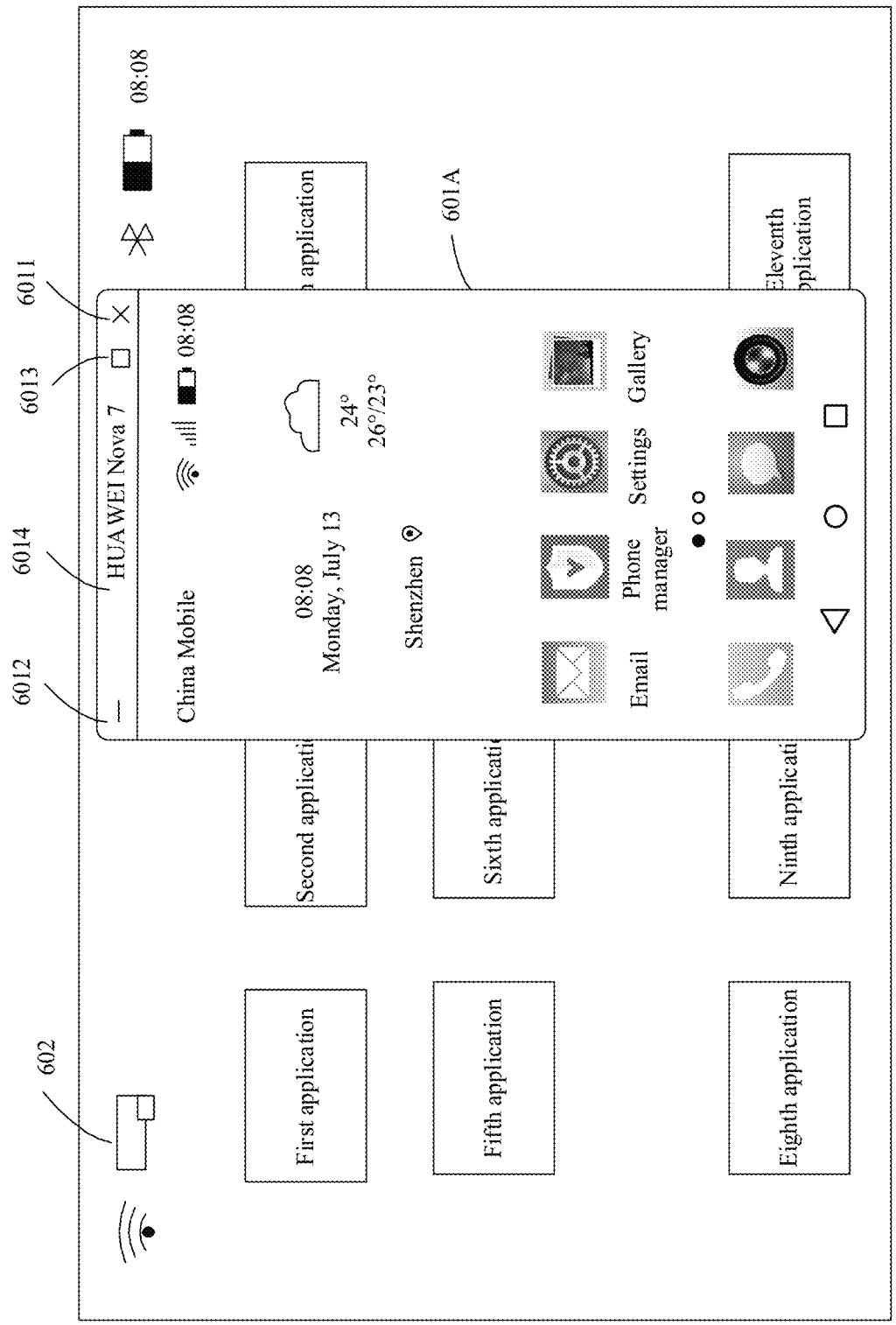
FIG. 6A and FIG. 6B each are a schematic diagram of a user interface of an electronic device according to an embodiment of this application.
Figure 6B:
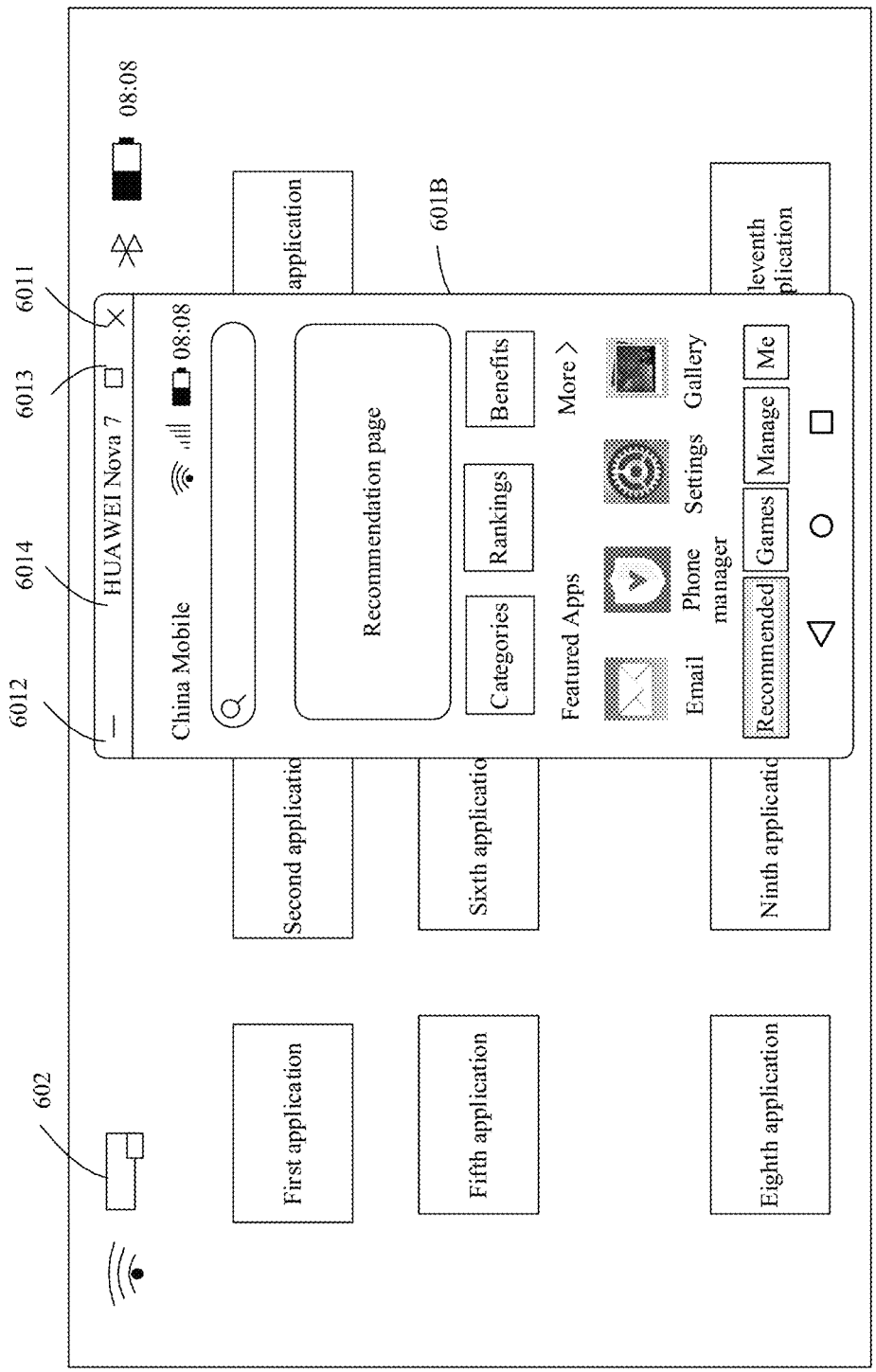

For example, for the window, refer to a window 601A in FIG. 6A. A size of the window 601A matches a size of the display of the first device. In this embodiment of this application, the window 601A shown in FIG. 6A may be referred to as a second window, but content displayed in the second window is not limited to content shown in the window 601A.

The first application may be any one of applications installed on the first device, and the first application may be a necessary application installed on the first device before delivery, for example, a system application such as a desktop application, file management, or settings. Alternatively, the first application may be an optional application installed on the first device, for example, a third-party application such as WeChat, Taobao, Amap, or Meituan. The optional application is not limited to a third-party application, or may be an application produced by a brand of the first device, for example, a HUAWEI "AppGallery" application. Some applications may sometimes be necessary system applications, and sometimes may be optional applications. For example, in some possible embodiments, the HUAWEI "AppGallery" application may be a necessary system application of the first device.

In this embodiment of this application, the first application is mainly described by using a desktop application and an "Apps market" application as an example. However, this does not constitute a limitation on this technical solution.

For another example of a window mapped from the first device to the second device, refer to FIG. 6B. A window 601B shown in FIG. 6B is a user interface of "Apps market" application, that is, a user interface displayed in the first device is also the user interface of "Apps market". It should be noted that a user interface displayed in the window 601B in FIG. 6B may alternatively be a user interface of another application, for example, may be a user interface of an application such as WeChat, QQ, or HUAWEI Vmall. A specific application is not limited in this solution.

Similarly, in this embodiment of this application, the window 601B shown in FIG. 6B may also be referred to as a second window, but content displayed in the second window is not limited to content shown in the window 601B.

A window 601 shown in FIG. 6A is a schematic diagram of a desktop of the first device. The desktop of the first device is also an application, that is, the foregoing desktop application. Therefore, the window 601 shown in FIG. 6A may also be understood as a user interface including the desktop application of the first device.

It should be noted that in addition to the resource manager and the "collaboration framework", "Collaboration assistant" of the first device may alternatively obtain the first interface display information by using another module at an application framework layer in response to the event notification. This is not limited in this embodiment of this application.

Case 2: The first device and the second device are logged in to a same system account.

In a specific embodiment, it is assumed that the first device and the second device are devices of a same brand, and the two devices are logged in to a same system account after being started, that is, the two devices are devices with a same account. In this case, the first device and the second device may be connected in the following manner.

Specifically, when NFC functions of the first device and the second device are both enabled, the second device may be placed to approach or touch the second device. For example, a preset part of the second device, for example, a back, may be placed to approach or touch a preset location on the second device, for example, a location with a sharing or connection tag. The first device and the second device may discover each other. A display of the second device may display a user interface of the discovered second device, for example, the interface shown in FIG. 5A.

In the user interface shown in FIG. 5A, the second device sends a connection request to the second device in response to a touch control operation on the "Connect" control 5014. Because the first device and the second device are devices of a same account, the first device and the second device automatically establish a trust relationship. After receiving the connection request sent by the second device, the second device automatically confirms a connection. After the connection is confirmed, the connection between the two devices is completed. For example, in this case, the second device displays the user interface shown in FIG. 6A or FIG. 6B.

It should be noted that a manner in which the first device and the second device establish the communication connection to implement data sharing further includes another manner. For example, the communication connection may be implemented through Bluetooth, a data line, or another method of near field communication (NFC). This is not limited in this embodiment of this application.

Some embodiments of graphical user interfaces implemented on the second device after the first device establishes the connection to the second device are described below. An example in which the second device is a tablet computer is used for description.

FIG. 6A and FIG. 6B show example diagrams in which the first device maps a user interface displayed on the display of the first device to the display of the second device after the first device establishes the connection to the second device. For an example of a user interface displayed by the second device by default, refer to the window 601A in FIG. 6A and the window 601B shown in FIG. 6B. The window 601A and the window 601B may be referred to as collaboration windows.

It can be seen from FIG. 6A and FIG. 6B that sizes of the window 601A and the window 601B do not match a size of the display of the second device. The not matching may mean that length-width ratios of the window 601A and the window 601B may be different from a length-width ratio of the display of the second device, or mean that the window 601A and the window 601B occupy only a part of an area of the display of the second device.

In FIG. 6A, in addition to a user interface 601A1 mapped from the first device (the user interface 601A1 mapped from the first device may be referred to as a mapped window 601A1), the window 601A may further include a title bar 601A2. The title bar 601A2 may include a hide control 6011, a minimize control 6012, a maximize control 6013, and a name 6014 of the first device.

The hide control 6011 may be used to hide the window 601A. The second device hides the window 601A in response to an operation of tapping or touching the hide control 6011. The second device may restore the window 601A on a display interface on the display in response to an operation of tapping or touching a "Collaboration assistant" icon 602 shown in FIG. 6A.

In a possible implementation, the hide control 6011 may be configured to disconnect the first device from the second device, and the second device may actively disconnect from the first device in response to an operation of tapping or touching the hide control 6011. If the second device needs to re-establish a connection to the first device, refer to the foregoing corresponding description of establishing a connection. Details are not described herein again.

Figure 7:
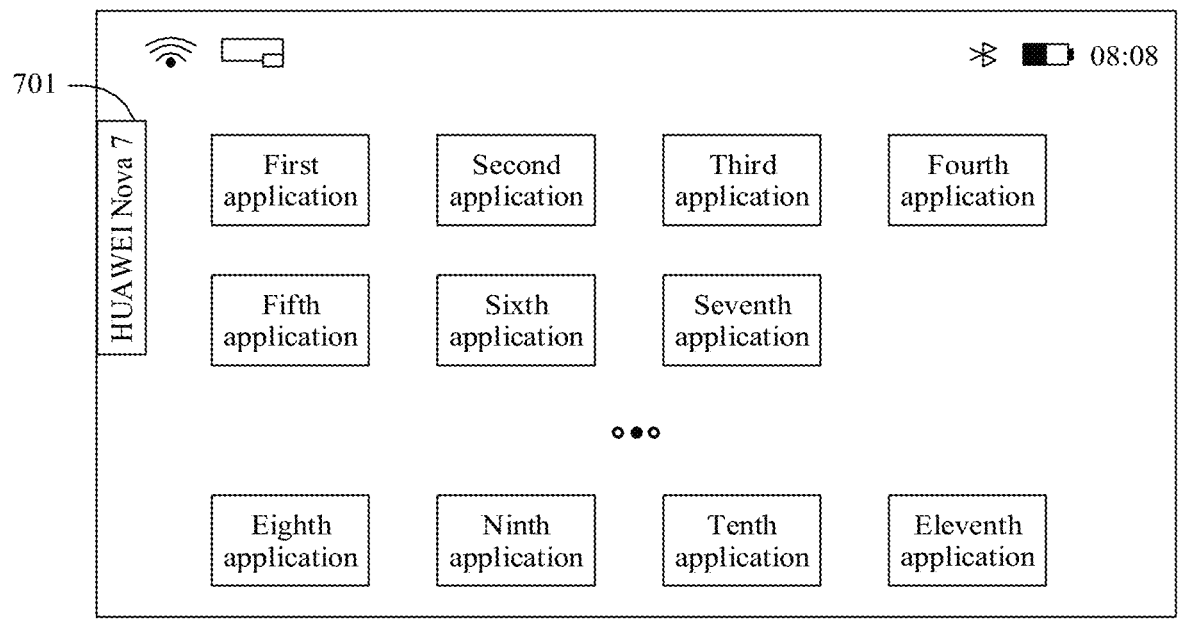
FIG. 7 to FIG. 11 each are a schematic diagram of a user interface of an electronic device according to an embodiment of this application.

The minimize control 6012 may be configured to minimize the window 601A. In response to an operation of tapping or touching the minimize control 6012, the second device minimizes the window 601A, for example, minimizes the window 601A to being at an edge of the display of the second device. For example, refer to FIG. 7. In FIG. 7, a small window 701 is the minimized window 601A. For example, the small window 701 may include a name of the first device, for example, HUAWEI Nova 7. It should be noted that a location of the small window 701 on the display of the second device is not limited to a location shown in FIG. 7, and may be any location at the edge of the display. The second device may restore the window 601A in response to an operation of tapping or touching the small window 701.

Alternatively, the minimize control 6012 may be configured to switch the window 601A to the background for running, and when the window 601A needs to be displayed on the display, the window 601A is invoked from the background.

The maximize control 6013 may be configured to maximize the window 601A. In response to an operation of tapping or touching the maximize control 6013, the second device maximizes the window 601A, for example, enables the window 601A to cover the entire display. How to use the maximize control and a function of the maximize control is described below. Details are not described herein.

The name 6014 of the first device may be, for example, HUAWEI Nova 7.

For composition and a function of the window 601B in FIG. 6B, refer to the description of the window 601A in FIG. 6A. Details are not described herein again.

After the first device establishes the communication connection to the second device, the first device may send, to the second device in real time by using "Collaboration assistant", data of a user interface displayed on the display of the first device and information used to display the user interface. The second device may update the collaboration window in real time based on the obtained information, so that content displayed in the collaboration window always includes content that is being displayed on the display of the first device.

The following uses several embodiments as an example to describe a process in which after receiving, by using "Collaboration assistant", the first interface display information sent by the first device, the second device displays, based on the first interface display information, a window mapped from the first device in full screen or in a manner of entering a multi-window mode.

Figure 14:
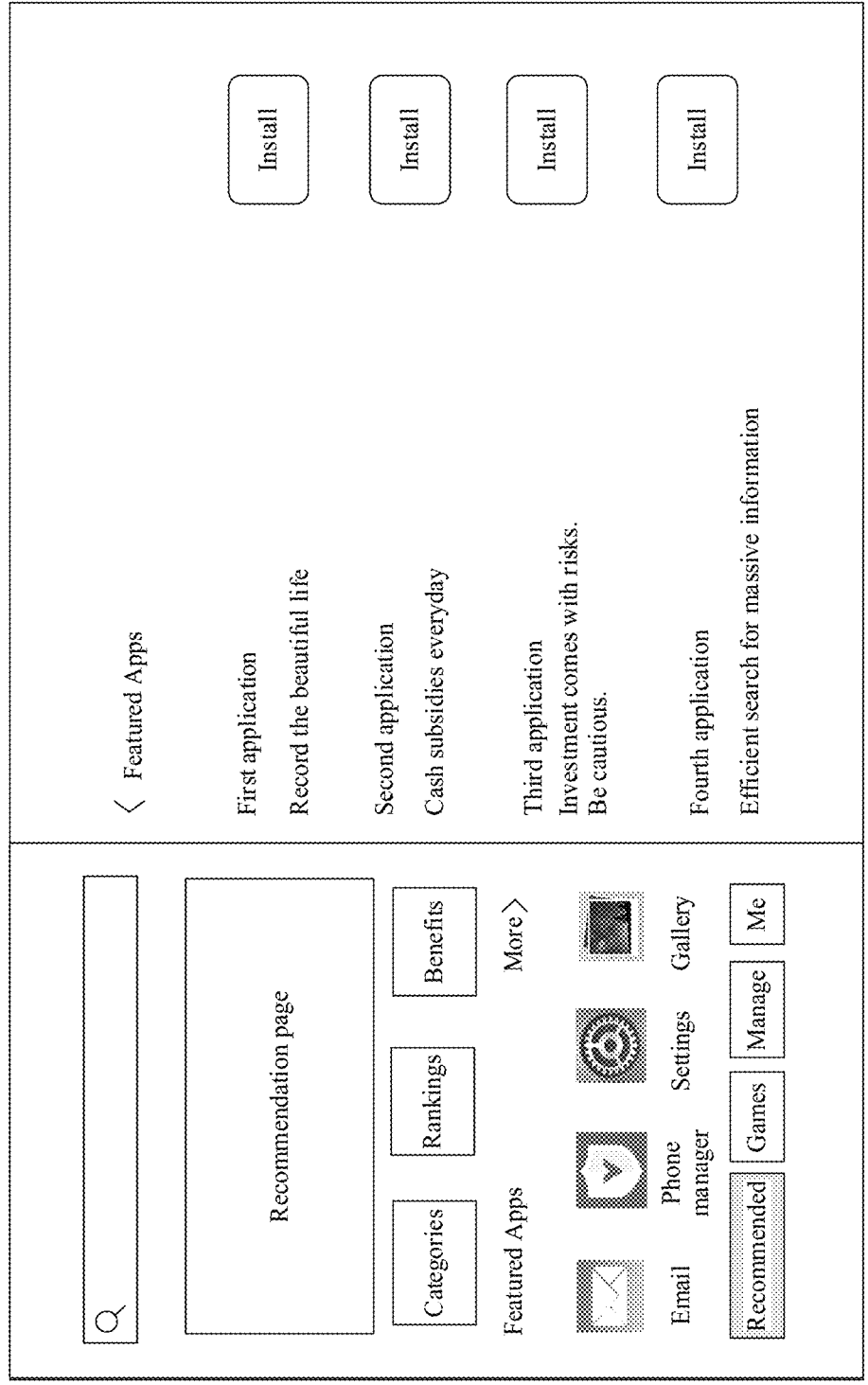

It should be noted that the multi-window mode in this embodiment of this application refers to that a same application includes a plurality of windows of different user interfaces. The foregoing "Apps market" is used as an example. A user interface displayed on the display of the second device includes a home page of "Apps market" and a browsing page of "Featured Apps". The user interface is in the multi-window mode according to this application. For example, refer to a user interface shown in FIG. 11 or FIG. 14. Details are described below, and the details are not described herein.

Embodiment 1

In Embodiment 1, a process of displaying a collaboration window in full screen is described based on the foregoing maximize control 6013, and an example in which the collaboration window is the window 601A shown in FIG. 6A is used for description.

In the user interface shown in FIG. 6A, the second device receives an operation of tapping or touching the maximize control 6013, and in response to the operation, the second device determines whether the window 601A has a full-screen display attribute.

In a specific embodiment, the first interface display information sent by the first device to the second device by using "Collaboration assistant" includes a screenOrientation (screenOrientation) attribute of an activity of an application corresponding to a user interface shown in the window 601A, and the screenOrientation attribute may be included in the stack information. Therefore, the second device may extract the screenOrientation attribute information of the activity of the application by using a stack manager (for example, the stack manager shown in FIG. 3), and then check whether the attribute information is "landscape", which indicates a landscape mode, that is, indicates that full-screen zoom-in can be performed.

When the attribute information is "landscape", the second device invokes a window manager to zoom in the window 601A in full screen. For a schematic diagram of the window 601A zoomed-in in full screen, refer to FIG. 8. A user interface shown in FIG. 8 may include a mapped window 801 and a title window 802.

The mapped window 801 is a display window that is of a user interface displayed on the display of the first device and that is maximized in the second device.

The title window 802 may include the hide control 6011, the minimize control 6012, the name 6014 of the first device, and a window restore control 6015.

It can be seen that the maximize control 6013 in the window 601A is changed into the window restore control 6015. The window restore control 6015 may be configured to restore the full-screen interface shown in FIG. 8 to the window 601A shown in FIG. 6A. Specifically, the second device may receive an operation of tapping or touching the window restore control 6015. In response to the operation, the second device may invoke the window manager to restore the full-screen interface shown in FIG. 8 to the window 601A.

Figure 8:
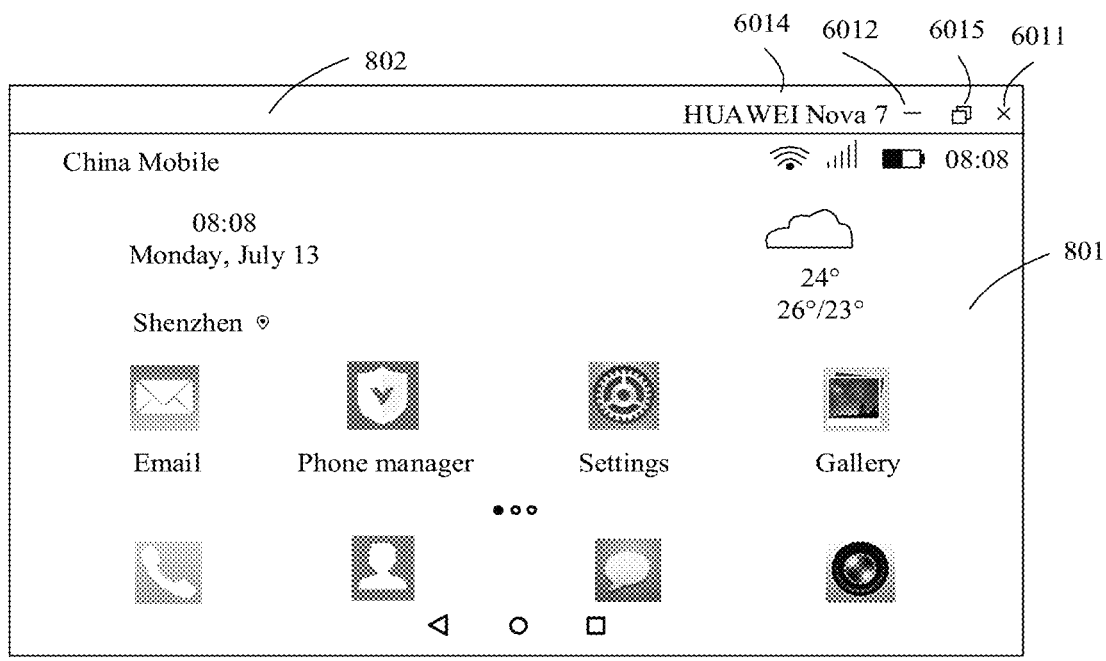

In addition, it can be learned from FIG. 8 that display locations of the hide control 6011, the minimize control 6012, and the name 6014 of the first device are also different from those in FIG. 6A. Display locations and arrangement statuses of the hide control 6011, the minimize control 6012, the name 6014 of the first device, and the window restore control 6015 are not limited to the case shown in FIG. 8, and may also be other cases. This is not limited in this solution. In addition, icons of these controls are not limited to shapes shown in FIG. 8, and may also be other shapes. This is not limited in this solution.

Figure 12A:
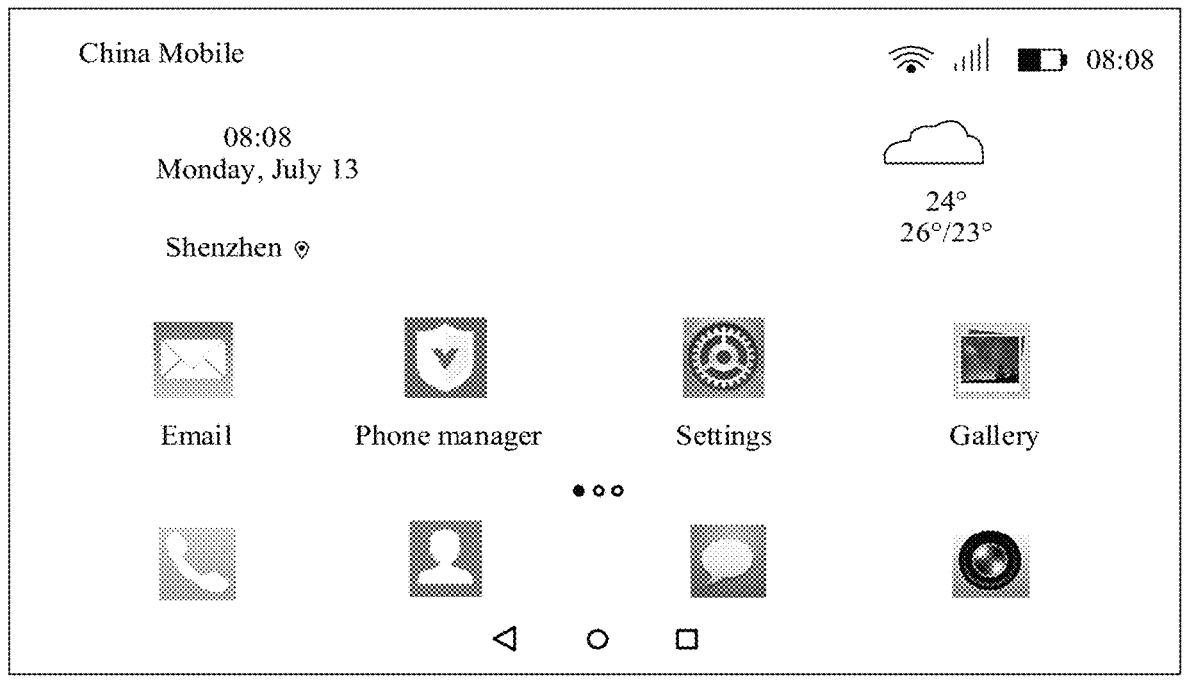
FIG. 12A and FIG. 12B each are a schematic diagram of a user interface of an electronic device according to an embodiment of this application.

In a possible implementation, the title window 802 may not be displayed in FIG. 8. In this case, the mapped window 801 may cover the entire display of the second device for displaying. For example, refer to FIG. 12A. Then, the full screen display of the mapped window may be exited by receiving an operation of double-clicking the mapped window that covers the entire display. Alternatively, other methods may be used, for example, receiving an instruction of an Esc key to exit the full screen display of the mapped window.

Embodiment 2

In Embodiment 2, a process in which a collaboration window enters a multi-window mode is described based on the foregoing maximize control 6013, and an example in which the collaboration window is the window 601B shown in FIG. 6B is used for description.

In the user interface shown in FIG. 6B, the second device receives an operation of tapping or touching the maximize control 6013, and in response to the operation, the second device determines whether the window 601B has a full-screen display attribute.

In a specific embodiment, the first interface display information sent by the first device to the second device by using "Collaboration assistant" includes a screenOrientation (screenOrientation) attribute of an activity of "Apps market" shown in the window 601B, and the screenOrientation attribute may be included in the stack information. Therefore, the second device may extract the screenOrientation attribute information of the activity of "Apps market" by using a stack manager (for example, the stack manager shown in FIG. 3), and then check whether the attribute information is "landscape", which indicates a landscape mode, that is, indicates that full-screen zoom-in can be performed.

When the attribute information is not "landscape", the second device invokes a window manager to switch the window 601B to a state of the multi-window mode based the first interface display information sent by the first device.

Specifically, the second device may check, by using the window manager, a quantity of windows whose stack information is included in the stack information in the first interface display information. Two cases are described below.

In a first case, the stack information includes stack information of one window.

If the stack information includes stack information of only one window (the window is usually a home page window of "Apps market"), the window manager of the second device displays the home page window on one side of the display of the second device, and then customizes a fill window to be displayed on the other side of the display. The fill window may be a window that is customized by the second device to display in a user interface of "Apps market". For example, refer to FIG. 9.

Figure 9:
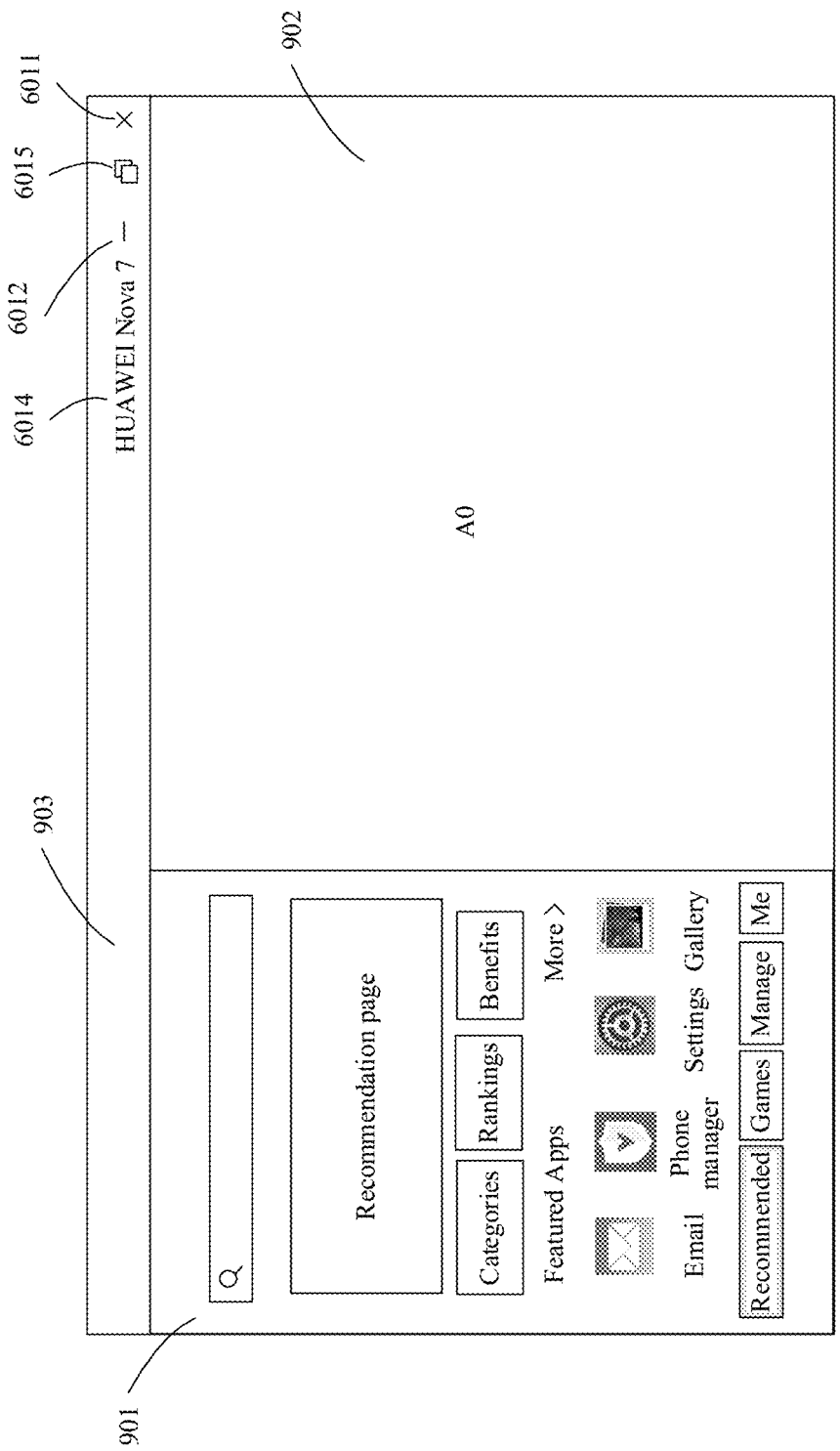

A user interface shown in FIG. 9 may include a home page window 901, a fill A0 window 902, and a title window 903.

The home page window 901 is configured to display a home page user interface of "Apps market". The fill A0 window 902 is the foregoing customized window displayed in the user interface of "Apps market". For a description of the title window 903, refer to the description of the title window 803. Details are not described herein again.

It can be seen from FIG. 9 that, the home page window 901, the fill A0 window 902, and the title window 903 may cover the entire display of the second device in full screen.

In a possible implementation, the fill window may alternatively display advertisement content, introduction content of the filling window, other customized content, or the like. This is not limited in this solution herein.

Figure 13:
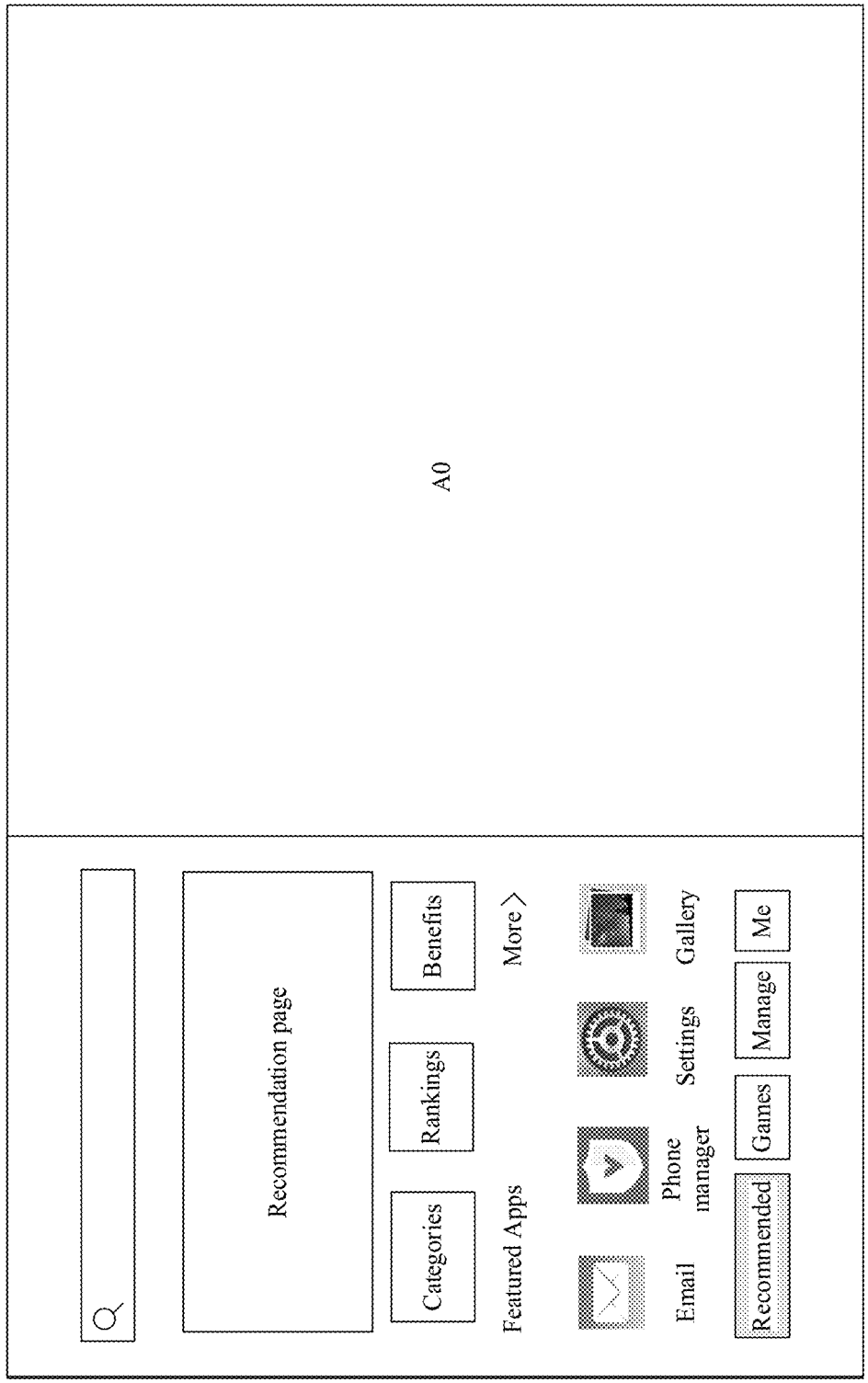
FIG. 13 and FIG. 14 each are a schematic diagram of a user interface of an electronic device according to an embodiment of this application.

In a possible implementation, the title window 903 may not be displayed in FIG. 9. In this case, the home page window 901 and the fill A0 window 902 may cover the entire display of the second device for displaying. For example, refer to FIG. 13. Then, the full screen display may be exited by receiving an operation of double-clicking the display. Alternatively, other methods may be used, for example, receiving an instruction of an Esc key to exit the full screen display.

In a second case, the stack information includes stack information of a plurality of windows.

The plurality of windows are usually a home page window of "Apps market" and a window of another user interface that is entered based on the home page window. For example, refer to FIG. 6B. If the first device just starts to display the home page window 601B1 of "Apps market" (because the home page window 601B1 is mapped from the first device, a window displayed by the first device in this case is the home page window 601B1), the first device may enter a user interface of "Featured Apps" in response to an operation of tapping or touching a "More" control in the window 601B1. That is, the user interface of "Featured Apps" is displayed on the display of the first device. In this case, after coordination is performed with the second device, the collaboration window of the second device also displays the user interface of "Featured Apps". For example, refer to a window 601C in FIG. 10. For composition and a function of the window 601C in FIG. 10, refer to the description of the window 601A in FIG. 6A. Details are not described herein again.

Figure 10:
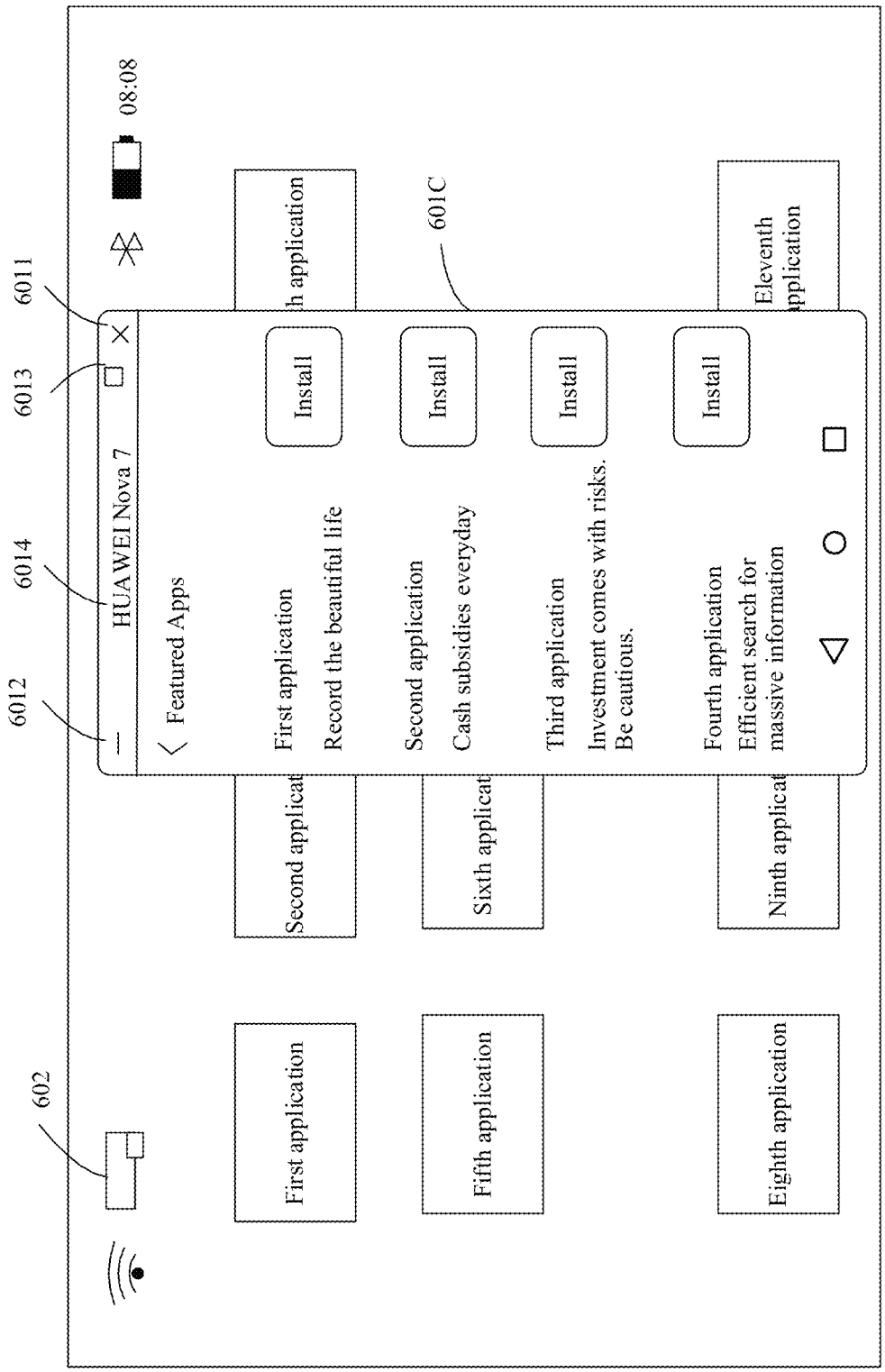

It should be noted that, although the window 601C1 in FIG. 10 displays only a window of the user interface of "Featured Apps", the stack information sent by the first device includes stack information of the window and the home page window. In a collaboration window stack of the second device, a window stack of "Featured Apps" is at the top of the stack, and a stack of the home page window is at the bottom of the stack.

In this case, the window manager of the second device displays the home page window on one side of the display of the second device based on the stack information and display data in the first interface display information, and then displays the window of "Featured Apps" on the other side of the display. For example, refer to FIG. 11.

Figure 11:
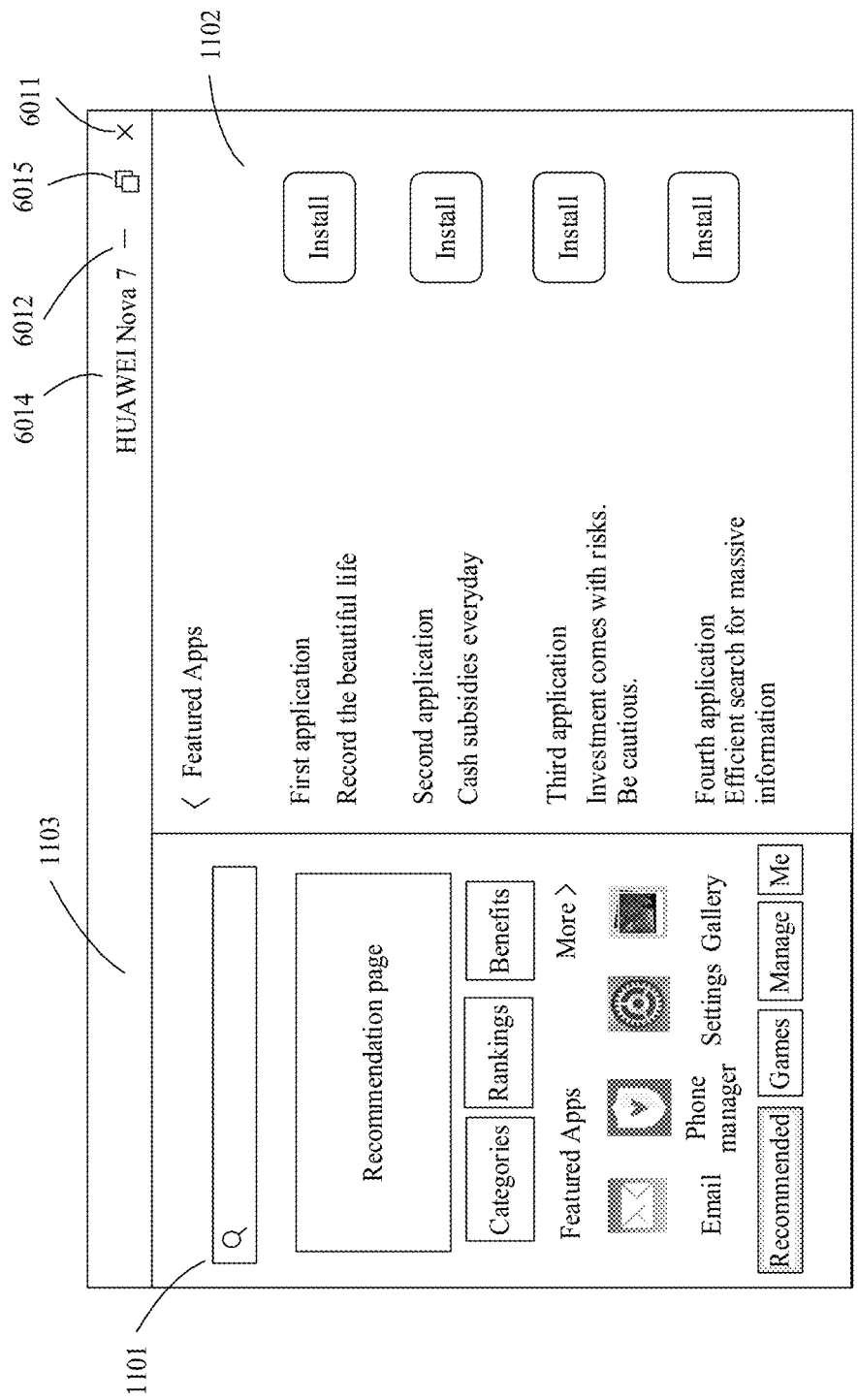

A user interface shown in FIG. 11 may include a home page window 1101, a window 1102 of "Featured Apps" and a title window 1103.

The home page window 1101 is configured to display a home page of a user interface of "Apps market", and the window 1102 of "Featured Apps" displays the user interface of "Featured Apps". For a description of the title window 1103, refer to the description of the title window 803, and details are not described herein again.

It can be seen from FIG. 11 that, the home page window 1101, the window 1102 of "Featured Apps", and the title window 1103 may cover the entire display of the second device in full screen.

In a possible implementation, the title window 1103 may not be displayed in FIG. 11. In this case, the home page window 1101 and the window 1102 of "Featured Apps" may cover the entire display of the second device. For example, refer to FIG. 14. Then, the full screen display may be exited by receiving an operation of double-clicking the display. Alternatively, other methods may be used, for example, receiving an instruction of an Esc key to exit the full screen display.

Certainly, an example in which the stack information includes two windows is merely used for description herein. Alternatively, three, four, or more windows may be included, and a specific implementation process is similar. For details, refer to the foregoing description. The details are not described herein again.

In the foregoing embodiment, a process of displaying a collaboration window in full screen or entering a multi-window mode by a collaboration window is described based on the foregoing maximize control 6013. The following describes a process of displaying a collaboration window in full screen or entering a multi-window mode by a collaboration window without using the maximize control 6013.

In a specific embodiment, after the first device sends the first interface display information to the second device through "Collaboration assistant", and the second device receives the first interface display information through "Collaboration assistant" of the second device, the second device may directly enter full-screen display of the collaboration window based on the first interface information, or the collaboration window enters a multi-window mode interface. To be specific, the second device does not need to first generate a small collaboration window (for example, the window 601A in FIG. 6A or the window 601B in FIG. 7) based on the first interface display information, but may directly display a large collaboration window (for example, the window shown in FIG. 8). This saves a complex operation of switching from a small window to a large window, further facilitates a user operation, and improves user experience. The following uses Embodiment 3 and Embodiment 4 as examples for description.

Embodiment 3

Embodiment 3 describes a process in which the second device directly enters full-screen display of the collaboration window based on the first interface information.

Specifically, the first interface display information sent by the first device to the second device by using "Collaboration assistant" may include a screenOrientation attribute of an activity of an application corresponding to a user interface that is being displayed by the first device, and the screenOrientation attribute may be included in the stack information. Therefore, the second device may extract the screenOrientation attribute information of the activity of the application by using a stack manager (for example, the stack manager shown in FIG. 3), and then check whether the attribute information is "landscape".

When the attribute information is "landscape", the second device invokes the window manager to display, in full screen based on the first interface display information, a user interface mapped from the first device. For example, for the interface displayed in full screen, refer to the interface shown in FIG. 8 or FIG. 12A. For descriptions of FIG. 8 or FIG. 12A, refer to the foregoing descriptions. Details are not described herein again.

Embodiment 4

Embodiment 4 describes a process in which the second device directly enters the multi-window mode based on the first interface information.

Similarly, in a specific embodiment, the first interface display information sent by the first device to the second device by using "Collaboration assistant" may include a screenOrientation attribute of an activity of an application corresponding to a user interface that is being displayed by the first device, and the screenOrientation attribute may be included in the stack information. Therefore, the second device may extract the screenOrientation attribute information of the activity of the application by using a stack manager (for example, the stack manager shown in FIG. 3), and then check whether the attribute information is "landscape".

When the attribute information is not "landscape", the second device may check, by using the window manager, a quantity of windows whose stack information is included in the stack information in the first interface display information. Two cases are described below.

In a first case, the stack information includes stack information of one window.

If the stack information includes stack information of only one window (the window is usually a home page window of the application corresponding to the user interface that is being displayed by the first device), the window manager of the second device displays the home page window on one side of the display of the second device, and then customizes a fill window to be displayed on the other side of the display. The fill window may be a window that is customized by the second device to display in a user interface of "Apps market". For example, refer to FIG. 9 or FIG. 13. For descriptions of FIG. 9 or FIG. 13, refer to the foregoing descriptions. Details are not described herein again.

In a second case, the stack information includes stack information of a plurality of windows.

The plurality of windows are usually the home page window of the application corresponding to the user interface that is being displayed by the first device and a window of another user interface that is entered based on the home page window. Refer to the foregoing descriptions with reference to FIG. 6B and FIG. 10 for understanding. Details are not described herein again.

In this case, the window manager of the second device displays the home page window on one side of the display of the second device based on the stack information and display data in the first interface display information, and then displays the window of another user interface that is entered based on the home page window on the other side of the display. For example, refer to FIG. 11 or FIG. 14. For descriptions of FIG. 11 or FIG. 14, refer to the foregoing descriptions. Details are not described herein again.

Certainly, an example in which the stack information includes two windows is merely used for description herein. Alternatively, three, four, or more windows may be included, and a specific implementation process is similar. For details, refer to the foregoing description. The details are not described herein again.

In a possible implementation, in the foregoing Embodiment 1 to Embodiment 4, the second device may not display the collaboration window mapped from the first device in full screen, but may occupy only a relatively large part of an area of the display of the second device, for example, three fourths, four fifths, or five sixths of the area of the display of the second device, to display the collaboration window mapped from the first device. Specifically, a size for displaying the collaboration window may be managed and implemented by using the window manager (for example, the window manager shown in FIG. 3).

The foregoing describes a process in which the second device displays in full screen (or zooms in) the collaboration window mapped from the first device and a process in which the collaboration window enters the multi-window mode. The following describes the two processes based on whether an application corresponding to the collaboration window is installed on the second device. The following uses Embodiment 5 to Embodiment 8 as examples for description.

Embodiment 5

Embodiment 5 describes a process of entering full-screen display with reference to FIG. 6A and based on whether an application corresponding to a user interface displayed by the first device is installed on the second device.

In a specific embodiment, in the user interface shown in FIG. 6A, the second device receives an operation of tapping or touching the maximize control 6013, and in response to the operation, the second device determines whether the window 601A has a full-screen display attribute.

When the second device determines, by using the method in Embodiment 1, that screenOrientation attribute information of an activity of an application (the application may be the desktop application) corresponding to a user interface shown in the window 601A is "landscape", the second device may invoke a package manager (for example, the package manager in FIG. 3) to determine whether the desktop application is installed on the second device.

Specifically, it can be learned from the foregoing description that the first interface display information that is sent by the first device and received by the second device includes a package name of the desktop application. In this case, the package manager of the second device may obtain the package name of the desktop application, and then query whether the package name of the desktop application is included in package names of applications installed on the second device. If the package name of the desktop application is included, it indicates that the desktop application is installed on the second device, or if the package name of the desktop application is not included, it indicates that the desktop application is not installed on the second device.

Alternatively, in a possible implementation, in response to the operation of tapping or touching the maximize control 6013, the second device may simultaneously perform an operation of determining the screenOrientation attribute of the activity of the desktop application and an operation of determining whether the desktop application is installed on the second device.

When the desktop application is not installed on the second device, the second device invokes the window manager to zoom in the window 601A in full screen. For a schematic diagram of the window 601A after being zoomed-in in full screen, refer to FIG. 8 or FIG. 12A. For descriptions of FIG. 8 or FIG. 12A, refer to the foregoing descriptions. Details are not described herein again.

When the desktop application is installed on the second device, the second device starts the desktop application of the second device (if the desktop application is already started, the desktop application does not need to be started again), and displays, in a user interface of the desktop application based on the obtained first interface display information, content that is the same as that of a user interface that is of the desktop application and that is displayed by the first device. The user interface that is of the desktop application and that is displayed by the second device may alternatively be displayed in full screen. For example, refer to the interface shown in FIG. 12A. In this case, the collaboration window 601A returns to the background for running. Alternatively, in this case, the collaboration window 601A may be closed.

Specifically, the second device may invoke the window manager to obtain a package name and a class name of the activity of the desktop application in the stack information of the first interface display information, and then form an intent by using the package name and the class name, to start a window. The window keeps the same as an interface of the collaboration window 601A, or the started window includes content consistent with that of the interface displayed by the first device.

In a possible implementation, when the desktop application is installed on the second device, the second device may provide a selection window for a user, so that the user selects whether to enter a full-screen interface (or a zoomed-in interface) through the collaboration window 601A or enter a full-screen interface (or a zoomed-in interface) through the desktop application installed on the second device. For example, refer to FIG. 12B.

Figure 12B:
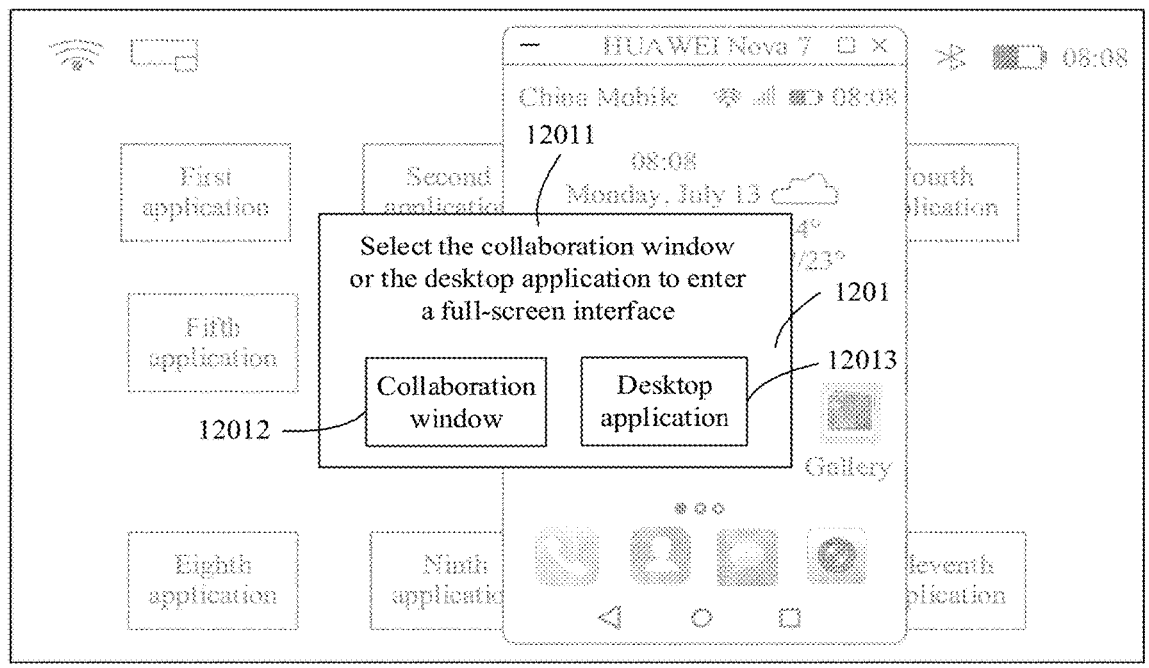

It can be seen from FIG. 12B that a selection window 1201 is displayed based on the user interface shown in FIG. 6A. The selection window 1201 includes an indication 12011, a selection button 12012 of a collaboration window, and a selection button 12013 of a desktop application. For example, content of the indication 12011 may be as follows: "Select the collaboration window or the desktop application to enter a full-screen interface."

The second device may enter a full-screen interface (or a zoomed-in interface) through the collaboration window 601A in response to a user operation of tapping or touching the selection button 12012 of a collaboration window. Alternatively, the second device may enter a full-screen interface (or a zoomed-in interface) through the desktop application installed on the second device in response to a user operation of tapping or touching the selection button 12013 of a desktop application. For a specific process of entering the full-screen interface (or the zoomed-in interface), refer to the foregoing description. Details are not described herein again.

Embodiment 6

Embodiment 6 describes a process of entering the multi-window mode with reference to FIG. 6B and based on whether an application corresponding to a user interface displayed by the first device is installed on the second device.

In a specific embodiment, in a user interface shown in FIG. 6B, the second device receives an operation of tapping or touching the maximize control 6013, and in response to the operation, the second device determines whether the window 601B has a full-screen display attribute.

When the second device determines, by using the method in Embodiment 2, that screenOrientation attribute information of an activity of an application (the application may be an "Apps market" application) corresponding to the user interface shown in the window 601B is not "landscape", the second device may invoke a package manager (for example, the package manager in FIG. 3) to determine whether "Apps market" is installed on the second device.

Specifically, it can be learned from the foregoing description that the first interface display information that is sent by the first device and received by the second device includes a package name of "Apps market". In this case, the package manager of the second device may obtain the package name of "Apps market", and then query whether the package name of "Apps market" is included in package names of applications installed on the second device. If the package name of "Apps market" is included, it indicates that "Apps market" is installed on the second device, or if the package name of "Apps market" is not included, it indicates that "Apps market" is not installed on the second device.

Alternatively, in a possible implementation, in response to the operation of tapping or touching the maximize control 6013, the second device may simultaneously perform an operation of determining the screenOrientation attribute of the activity of "Apps market" and an operation of determining whether "Apps market" is installed on the second device.

When "Apps market" is not installed on the second device, the second device may display in the multi-window mode based on the first case and the second case in Embodiment 2. Details are not described herein again.

When "Apps market" is installed on the second device, the second device starts "Apps market" of the second device (if "Apps market" is already started, "Apps market" does not need to be started again), and enters the multi-window mode through a user interface of "Apps market" based on the obtained first interface display information. Content displayed includes content displayed in a user interface that is of "Apps market" and that is displayed by the first device. The user interface that is of "Apps market" and that is displayed by the second device may alternatively be displayed in full screen. For example, refer to an interface shown in FIG. 13 or the FIG. 14. In this case, the collaboration window 601B or the collaboration window 601C return to the background for running. Alternatively, in this case, the collaboration window 601B or the collaboration window 601C may alternatively be closed.

Specifically, the second device may invoke the window manager to obtain a package name and a class name of the activity of "Apps market" in the stack information of the first interface display information, and then form an intent by using the package name and the class name, to start a window. The window includes content of an interface of the collaboration window 601B, or the started window includes content consistent with that of the interface displayed by the first device.

In a possible implementation, when "Apps market" is installed on the second device, the second device may provide a selection window for a user, so that the user selects whether to enter the multi-window mode through the collaboration window 601B or enter the multi-window mode through a desktop application installed on the second device.

For a specific selection implementation process, refer to the foregoing description of FIG. 12B. Details are not described herein again.

Embodiment 7

Embodiment 7 describes a process in which the second device directly enters full-screen display based on the first interface information, based on whether an application corresponding to a user interface displayed by the first device is installed on the second device.

In a specific embodiment, the first interface display information sent by the first device to the second device by using "Collaboration assistant" may include a screenOrientation attribute of an activity of an application corresponding to a user interface that is being displayed by the first device (the application may be any application installed on the first device, and the application may be referred to as a target application), and the screenOrientation attribute may be included in the stack information. Therefore, the second device may extract the screenOrientation attribute information of the activity of the application by using a stack manager (for example, the stack manager shown in FIG. 3), and then check whether the attribute information is "landscape".

When the attribute information is "landscape", the second device may invoke a package manager (for example, the package manager in FIG. 3) to determine whether the target application is installed on the second device.

Specifically, it can be learned from the foregoing description that the first interface display information that is sent by the first device and received by the second device includes a package name of the target application. In this case, the package manager of the second device may obtain the package name of the target application, and then query whether the package name of the target application is included in package names of applications installed on the second device. If the package name of the target application is included, it indicates that the target application is installed on the second device, or if the package name of the target application is not included, it indicates that the target application is not installed on the second device.

Alternatively, in a possible implementation, after receiving the first interface display information, the second device may simultaneously perform an operation of determining the screenOrientation attribute of the activity of the target application and an operation of determining whether the target application is installed on the second device.

When the target application is not installed on the second device, the second device invokes the window manager to display, in full screen based on the first interface display information, a user interface mapped from the first device. For example, for the interface displayed in full screen, refer to the interface shown in FIG. 8 or FIG. 12A. For descriptions of FIG. 8 or FIG. 12A, refer to the foregoing descriptions. Details are not described herein again.

When the target application is installed on the second device, the second device starts the target application of the second device (if the target application is already started, the target application does not need to be started again), and displays, in a user interface of the target application based on the obtained first interface display information, content that is the same as that of a user interface that is of the target application and that is displayed by the first device. The user interface that is of the target application and that is displayed by the second device may alternatively be displayed in full screen. For example, still refer to the interface shown in FIG. 12A.

Specifically, the second device may invoke the window manager to obtain a package name and a class name of the activity of the target application in the stack information of the first interface display information, and then form an intent by using the package name and the class name, to start a window. The window includes content consistent with that of the interface displayed by the first device.

Embodiment 8

Embodiment 7 describes a process in which the second device directly enters the multi-window mode based on the first interface information, based on whether an application corresponding to a user interface displayed by the first device is installed on the second device.

In a specific embodiment, the first interface display information sent by the first device to the second device by using "Collaboration assistant" may include a screenOrientation attribute of an activity of an application corresponding to a user interface that is being displayed by the first device (the application may be any application installed on the first device, and the application may be referred to as a target application), and the screenOrientation attribute may be included in the stack information. Therefore, the second device may extract the screenOrientation attribute information of the activity of the application by using a stack manager (for example, the stack manager shown in FIG. 3), and then check whether the attribute information is "landscape".

When the attribute information is not "landscape", the second device may invoke a package manager (for example, the package manager in FIG. 3) to determine whether the target application is installed on the second device.

Specifically, it can be learned from the foregoing description that the first interface display information that is sent by the first device and received by the second device includes a package name of the target application. In this case, the package manager of the second device may obtain the package name of the target application, and then query whether the package name of the target application is included in package names of applications installed on the second device. If the package name of the target application is included, it indicates that the target application is installed on the second device, or if the package name of the target application is not included, it indicates that the target application is not installed on the second device.

Alternatively, in a possible implementation, after receiving the first interface display information, the second device may simultaneously perform an operation of determining the screenOrientation attribute of the activity of the target application and an operation of determining whether the target application is installed on the second device.

When the target application is not installed on the second device, the second device may display a window based on the first case and the second case in Embodiment 4. Details are not described herein again.

When the target application is installed on the second device, the second device starts the target application of the second device (if the target application is already started, the target application does not need to be started again), and displays, in a user interface of the target application based on the obtained first interface display information, content that is the same as that of a user interface that is of the target application and that is displayed by the first device. The user interface that is of the target application and that is displayed by the second device may alternatively be displayed in full screen. For example, still refer to the interface shown in FIG. 13 or FIG. 14.

Specifically, the second device may invoke the window manager to obtain a package name and a class name of the activity of the target application in the stack information of the first interface display information, and then form an intent by using the package name and the class name, to start a window. The window includes content displayed in the interface displayed by the first device.

The application examples in the foregoing embodiments are merely examples. A user interface of any application installed on the first device may be displayed in full screen on the display of the second device in a cross-device manner.

Similarly, in a possible implementation, in the foregoing Embodiment 5 to Embodiment 8, the second device may not display the collaboration window mapped from the first device in full screen, but may occupy only a relatively large part of an area of the display of the second device, for example, three fourths, four fifths, or five sixths of the area of the display of the second device, to display the collaboration window mapped from the first device. Specifically, a size for displaying the collaboration window may be managed and implemented by using the window manager (for example, the window manager shown in FIG. 3).

In the foregoing Embodiment 5 to Embodiment 8, the full-screen display or the multi-window mode is entered through a corresponding application, so that an effect of a displayed user interface can be better, a display delay can be reduced, and user experience can be improved.

The following describes an operation performed on the second device in response to an instruction of a user after a user interface displayed on the display of the first device is mapped to the display of the second device to perform full-screen display or to enter a multi-window display mode.

On the second device, for a user interface that enters full-screen display or a multi-window display mode through a collaboration window (refer to Embodiment 1 to Embodiment 4), after the second device receives, on the user interface, an instruction entered by the user, the second device sends the instruction to the first device through "Collaboration assistant" of the second device. After obtaining corresponding display data based on the instruction, the first device sends the display data to the second device through "Collaboration assistant" of the first device. The second device updates the user interface displayed on the display based on the received display data. Certainly, a display interface of the first device may alternatively be updated according to the foregoing instruction.

On the second device, for a user interface that enters full-screen display or a multi-window display mode through a corresponding application (refer to Embodiment 5 to Embodiment 8), after the second device receives, on the user interface, an instruction entered by the user, the second device may directly interact with a server of the application to update the user interface, and does not need to interact with the first device. Compared with the foregoing manner in which the user interface needs to be updated by interacting with the first device, in the manner according to this embodiment of this application, the user interface is updated by directly interacting with the server at a high speed, so that a delay in displaying the user interface can be reduced, and user experience can be improved.

It can be seen that, in the foregoing Embodiment 1 to Embodiment 8, a layout of the user interface displayed on the display of the second device is different from a layout of the user interface displayed on the display of the first device after the user interface displayed on the display of the first device is mapped to the display of the second device to perform the full-screen display on the display of the second device or enter the multi-window display mode on the display of the second device.

Figure 15:
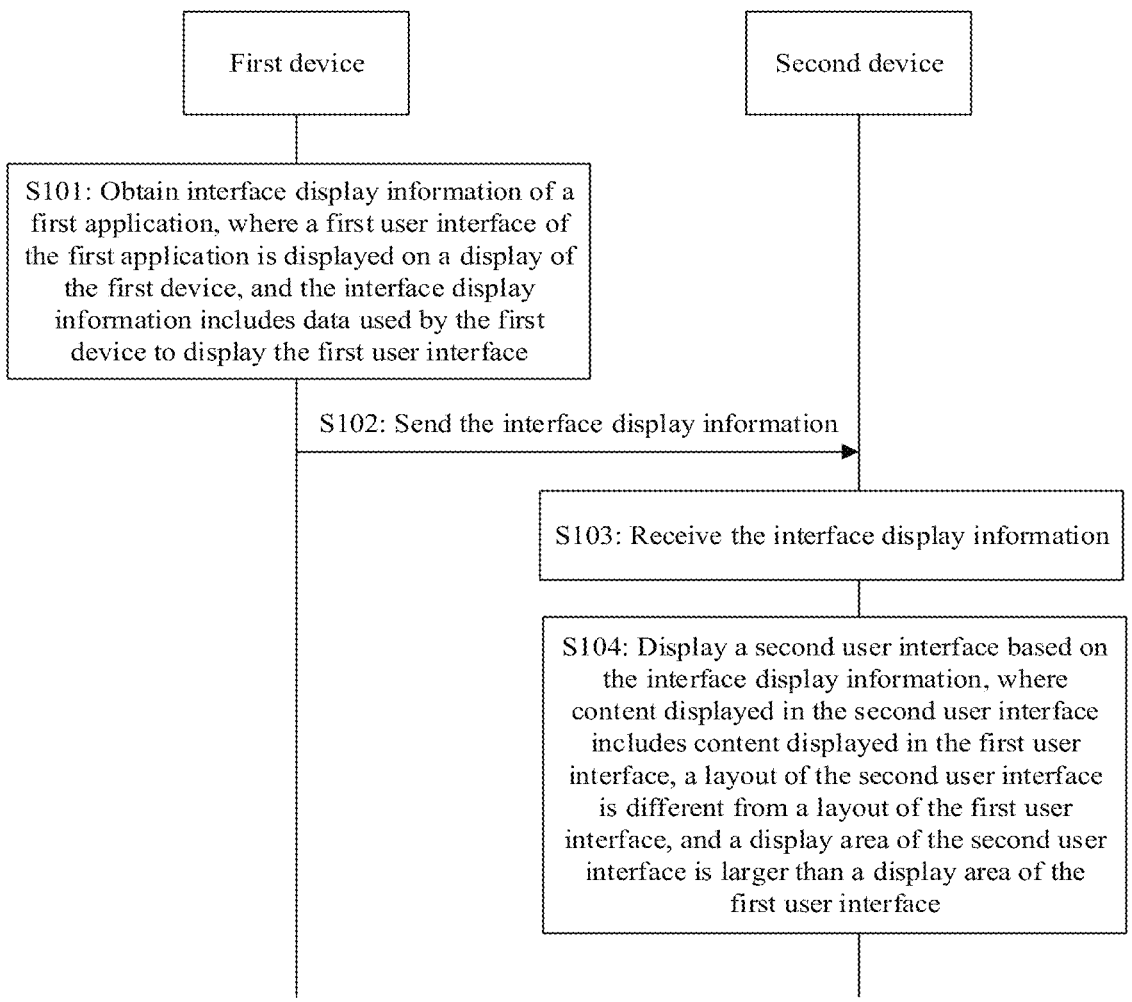
FIG. 15 is a schematic diagram of an interaction procedure of a display method according to an embodiment of this application.

Based on the foregoing description, FIG. 15 is a schematic diagram of an interaction procedure of a display method according to an embodiment of this application. Refer to FIG. 15. The display method may include the following steps.

S101: A first device obtains interface display information of a first application, where a first user interface of the first application is displayed on a display of the first device, and the interface display information includes data used by the first device to display the first user interface.

S102: The first device sends the interface display information to a second device.

S103: The second device receives the interface display information.

S104: The second device displays a second user interface based on the interface display information, where content displayed in the second user interface includes content displayed in the first user interface, a layout of the second user interface is different from a layout of the first user interface, and a display area of the second user interface is larger than a display area of the first user interface.

Specifically, the second user interface may be, for example, the display interface shown in FIG. 8, FIG. 9, FIG. 11, FIG. 12A, FIG. 13, or FIG. 14. The interface display information is the first interface display information in the foregoing method embodiment. The first application may be any application installed on the first device, for example, may be the desktop application, the "Apps market" application, or the target application in the foregoing embodiment. In embodiments of this application, a user interface may be a window, or a window may be a user interface. For details, refer to descriptions of the foregoing example diagrams.

In a possible implementation, after the first device sends the interface display information of the first application to the second device, and before the second device displays the second user interface based on the interface display information, the method further includes the following steps.

The second device displays a third user interface based on the interface display information, where a size of the third user interface does not match a size of a display of the second device, and content displayed in the third user interface is consistent with the content displayed in the first user interface; and the second device receives a first operation entered on a first control in the third user interface, where the first operation is used to trigger the second device to display the second user interface based on the interface display information.

The third user interface may be, for example, the window 601A1 shown in FIG. 6A or the window 601B1 shown in FIG. 6B.

In this embodiment of this application, the user interface mapped from the first device is first displayed based on a size of the display of the first device, so that a user can choose whether to display the user interface in full screen. This provides more options for the user.

In a possible implementation, that the second device displays a second user interface based on the interface display information includes: The second device determines based on the interface display information, that the first user interface has an attribute of landscape display; and the second device displays the second user interface based on the attribute of landscape display.

In a possible implementation, that the second device displays a second user interface based on the interface display information includes: The second device determines, based on the interface display information, that the first user interface has an attribute of no landscape display; and the second device displays the second user interface based on the attribute of no landscape display, where the second user interface includes a plurality of small windows, the plurality of small windows include a window of a home page of the first application and a window that includes content that is consistent with the content displayed in the first user interface, and all of the plurality of small windows are windows belonging to the first application.

In the foregoing two possible implementations, regardless of whether the first user interface has the attribute of landscape display, the first user interface can be displayed in full screen on the display of the second device. This provides a feasible solution for a user in multiple aspects, and improves user experience.

In a possible implementation, the plurality of small windows include the window of the home page of the first application and a fill window, and the fill window is a window customized by the second device to display in a user interface of the first application.

The fill window may be, for example, the A0 fill window 902 shown in FIG. 9.

In this embodiment of this application, the user interface of the first application displayed in full screen is presented to the user by using the fill window, to improve sensory experience of the user.

In a possible implementation, the interface display information includes information that is of the first application and that is in a task stack of the first device, and after the second device receives the first operation on the first control in the third user interface, the method further includes: The second device determines, based on the information that is of the first application and that is in the task stack of the first device, that the first application is installed on the second device; and the second device displays the second user interface through the first application based on the interface display information.

In a possible implementation, that the second device displays the second user interface through the first application based on the interface display information includes:

The second device displays, in response to a second operation, the second user interface through the first application based on the interface display information, where the second operation is a touch control operation on a selection button of the first application.

In this embodiment of this application, full-screen display is entered through a corresponding application, so that an effect of a displayed user interface can be better, a display delay can be reduced, and user experience can be improved.

For a specific implementation of this embodiment of this application, refer to specific descriptions of the plurality of embodiments provided above, and details are not described herein again.

In conclusion, in this application, application content displayed by the first device (for example, a mobile phone) can be mapped to the display of the second device (for example, a tablet computer) for large-screen display, so that a screen area of the second device is fully utilized, a user is provided with an option of performing a large-screen operation, and user experience is improved.

Based on the foregoing descriptions, it may be understood that, to implement the foregoing functions, each device includes corresponding hardware structures and/or software modules for performing corresponding functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the device may be divided into function modules based on the foregoing method examples. For example, each function module may be obtained through division based on each corresponding function, or two or more functions may be integrated into one module. The integrated module may be implemented in a form of hardware, or may be implemented in a form of a software functional module. It should be noted that, in embodiments of this application, division into modules is an example, and is merely a logical function division. In an actual implementation, another division manner may be used.

Figure 16:
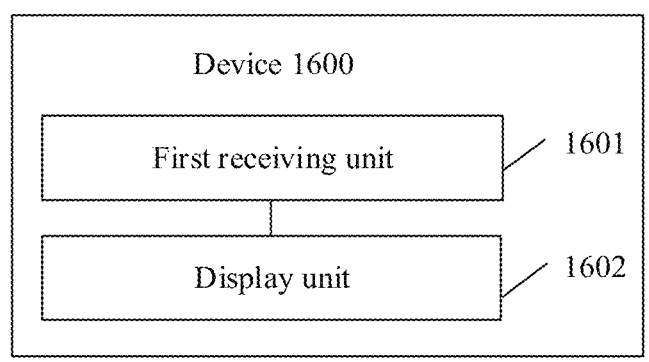
FIG. 16 is a schematic diagram of a logical structure of a device according to an embodiment of this application.

In a case in which each function module is obtained through division based on each corresponding function, FIG. 16 is a schematic diagram of a possible logical structure of a device. The device may be the second device in the foregoing embodiment. The device 1600 may include a first receiving unit 1601 and a display unit 1602.

The first receiving unit 1601 is configured to receive interface display information of a first application from a first device. A first user interface of the first application is displayed on a display of the first device, and the interface display information includes data used by the first device to display the first user interface.

The display unit 1602 is configured to display a second user interface based on the interface display information. Content displayed in the second user interface includes content displayed in the first user interface, a layout of the second user interface is different from a layout of the first user interface, and a display area of the second user interface is larger than a display area of the first user interface.

In a possible implementation, the display unit 1602 is further configured to: after the first receiving unit 1601 receives the interface display information of the first application from the first device, and before the display unit 1602 displays the second user interface based on the interface display information, display a third user interface based on the interface display information. A size of the third user interface does not match a size of a display of the device 1600, and content displayed in the third user interface is consistent with the content displayed in the first user interface.

The device 1600 further includes a second receiving unit, configured to receive a first operation entered on a first control in the third user interface. The first operation is used to trigger the device 1600 to display the second user interface based on the interface display information.

In a possible implementation, the display unit 1602 is specifically configured to: determine, based on the interface display information, that the first user interface has an attribute of landscape display; and display the second user interface based on the attribute of landscape display.

In a possible implementation, the display unit 1602 is specifically configured to: determine, based on the interface display information, that the first user interface has an attribute of no landscape display; and display the second user interface based on the attribute of no landscape display. The second user interface includes a plurality of small windows, the plurality of small windows include a window of a home page of the first application and a window that includes content that is consistent with the content displayed in the first user interface, and all of the plurality of small windows are windows belonging to the first application.

In a possible implementation, the plurality of small windows include the window of the home page of the first application and a fill window, and the fill window is a window customized by the device 1600 to display in a user interface of the first application.

In a possible implementation, the interface display information includes information that is of the first application and that is in a task stack of the first device, and the device 1600 further includes a determining unit, configured to: after the second receiving unit receives the first operation on the first control in the third user interface, determine, based on the information that is of the first application and that is in the task stack of the first device, that the first application is installed on the device 1600.

The display unit 1602 is further configured to display the second user interface through the first application based on the interface display information.

In a possible implementation, the display unit 1602 is specifically configured to: display, in response to a second operation, the second user interface through the first application based on the interface display information. The second operation is a touch control operation on a selection button of the first application.

For specific operations and beneficial effects of the units in the device shown in FIG. 16, refer to the description of the method embodiment shown in FIG. 15. Details are not described herein again.

According to the context, the term "when" used in the foregoing embodiments may be interpreted as a meaning of "if", "after", "in response to determining", or "in response to detecting". Similarly, according to the context, the phrase "when it is determined that" or "if (a stated condition or event) is detected" may be interpreted as a meaning of "if it is determined that" or "in response to determining" or "when (a stated condition or event) is detected" or "in response to detecting (a stated condition or event)".

All or some of the foregoing embodiments may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

A person of ordinary skill in the art may understand that all or some of the processes of the methods in embodiments may be implemented by a computer program instructing relevant hardware. The program may be stored in a computer-readable storage medium. When the program runs, the processes of the methods in embodiments are performed. The foregoing storage medium includes any medium that can store program code, such as a ROM, a random access memory (RAM), a magnetic disk, or an optical disc.

What is claimed is:

1. A system comprising:
   a first device configured to:
      display, on a first display of the first device, a first user interface of a first application, wherein the first user interface comprises a first layout and a first display area;
      display first content in the first user interface; and
      send interface display information corresponding to the first user interface; and
   a second device coupled to the first device and configured to:
      receive, from the first device, the interface display information;
      display, on a second display of the second device and based on the interface display information, a third user interface comprising a first control and third content, wherein the third content is consistent with the first content;
      receive a first operation on the first control;
      display, on the second display, in response to the first operation, and based on the interface display information, a second user interface of the first application without displaying the third user interface, wherein a second layout of the second user interface is different from the first layout, and wherein a second display area of the second user interface is larger than the first display area; and
      display second content in the second user interface, wherein the second content comprises the first content.

2. The system of claim 1, wherein a first size of the third user interface does not match a second size of the second display.

3. The system of claim 1, wherein the first user interface has a landscape display attribute, and wherein the second device is further configured to further display, based on the landscape display attribute, the second user interface.

4. The system of claim 1, wherein the first user interface has no landscape display attribute, wherein the second device is further configured to further display, based on the first user interface having no landscape display attribute, the second user interface, wherein the second user interface comprises a plurality of first windows, wherein the first windows comprise a second window of a home page of the first application and a third window comprising the first content, and wherein the first windows belong to the first application.

5. The system of claim 4, wherein the second device is further configured to display a fourth user interface of the first application, and wherein the fourth user interface comprises a fourth window having a fill window.

6. The system of claim 1, wherein the interface display information comprises first information that is of the first application and that is in a task stack of the first device, and wherein after receiving the first operation, the second device is further configured to:
  detect, based on the first information, that the first application is installed on the second device; and
  further display, in response to detecting that the first application is installed on the second device and through the first application, the second user interface.

7. The system of claim 6, wherein the second device is further configured to:
  obtain, on a selection button of the first application, a second operation comprising a touch control operation; and
  further display, in response to obtaining the second operation, the second user interface.

8. A method comprising:
  receiving, from a first device, interface display information of a first application, wherein the interface display information corresponds to a first user interface of the first application displayed on a first display of the first device, and wherein the first user interface displays first content and comprises a first layout and a first display area;
  displaying, on a second display of a second device and based on the interface display information, a third user interface comprising a first control and third content, wherein the third content is consistent with the first content;
  receiving a first operation on the first control;
  displaying, on the second display, in response to the first operation, and based on the interface display information, a second user interface of the first application without displaying the third user interface, wherein a second layout of the second user interface is different from the first layout, and wherein a second display area of the second user interface is larger than the first display area; and
  displaying second content in the second user interface, wherein the second content comprises the first content.

9. The method of claim 8, wherein a first size of the third user interface does not match a second size of the second display.

10. The method of claim 8, wherein the first user interface has a landscape display attribute, and wherein displaying the second user interface comprises displaying, based on the landscape display attribute, the second user interface.

11. The method of claim 8, wherein the first user interface has no landscape display attribute, wherein displaying the second user interface comprises displaying, based on the first user interface having no landscape display attribute, the second user interface, wherein the second user interface comprises a plurality of first windows, wherein the first windows comprise a second window of a home page of the first application and a third window comprising the first content, and wherein the first windows belong to the first application.

12. The method of claim 11, further comprising displaying a fourth user interface of the first application, wherein the fourth user interface comprises a fourth window having a fill window.

13. The method of claim 8, wherein the interface display information comprises first information that is of the first application and that is in a task stack of the first device, and wherein after receiving the first operation, the method further comprises:
  detecting, based on the first information, that the first application is installed on the second device; and
  further displaying, in response to detecting that the first application is installed on the second device and through the first application, the second user interface.

14. The method of claim 13, further comprising:
  obtaining, on a selection button of the first application, a second operation comprising a touch control operation; and
  further displaying, in response to obtaining the second operation, the second user interface.

15. An apparatus comprising:
  a second receiver configured to receive, from a first device, interface display information of a first application, wherein the interface display information corresponds to a first user interface of the first application displayed on a first display of the first device, and wherein the first user interface displays first content and comprises a first layout and a first display area; and
  a second display coupled to the second receiver and configured to:
    display, based on the interface display information, a third user interface comprising a first control and third content, wherein the third content is consistent with the first content;
    receive a first operation on the first control;
    display, in response to the first operation and based on the interface display information, a second user interface of the first application without displaying the third user interface, wherein a second layout of the second user interface is different from the first layout, and wherein a second display area of the second user interface is larger than the first display area; and
    display second content in the second user interface, wherein the second content comprises the first content.

16. The apparatus of claim 15, wherein a first size of the third user interface does not match a second size of the second display.

17. The apparatus of claim 15, wherein the first user interface has a landscape display attribute, and wherein the second display is further configured to further display, based on the landscape display attribute, the second user interface.

18. The apparatus of claim 15, wherein the first user interface has no landscape display attribute, wherein the second display is further configured to further display, based on the first user interface having no landscape display attribute, the second user interface, wherein the second user interface comprises a plurality of first windows, wherein the first windows comprise a second window of a home page of the first application and a third window comprising the first content, and wherein the first windows belong to the first application.

19. The apparatus of claim 18, wherein the second display is further configured to display a fourth user interface of the first application, and wherein the fourth user interface comprises a fourth window having a fill window.

20. The apparatus of claim 15, wherein the interface display information comprises first information that is of the first application and that is in a task stack of the first device, wherein the apparatus further comprises one or more processors coupled to the second display and configured to detect, based on the first information and after receiving the first operation, that the first application is installed on the apparatus, and wherein the second display is further configured to further display, in response to detecting that the first application is installed on the apparatus and through the first application, the second user interface.

* * * * *